United States Patent
Muramatsu et al.

(10) Patent No.: US 6,611,229 B2
(45) Date of Patent: Aug. 26, 2003

(54) VEHICLE TRACKING SYSTEM, VEHICLE-THEFT WARNING SYSTEM, STOLEN-VEHICLE TRACKING SYSTEM, AND THEFT-WARNING VEHICLE TRACKING SYSTEM

(75) Inventors: Harushi Muramatsu, Shizuoka (JP); Hiroki Oishi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/925,038

(22) Filed: Aug. 9, 2001

(65) Prior Publication Data

US 2002/0027523 A1 Mar. 7, 2002

(30) Foreign Application Priority Data

Aug. 9, 2000 (JP) ........................................ 2000-241373
Mar. 2, 2001 (JP) ........................................ 2001-057787
Jul. 6, 2001 (JP) ........................................ 2001-206962

(51) Int. Cl.$^7$ ............................. G01S 5/02; H04B 7/185
(52) U.S. Cl. .......................... 342/357.07; 342/357.09; 342/357.1; 342/357.13; 701/208
(58) Field of Search ....................... 342/357.07, 357.1, 342/357.09, 357.13; 701/208

(56) References Cited

U.S. PATENT DOCUMENTS

| | | | | |
|---|---|---|---|---|
| 5,223,844 A | * | 6/1993 | Mansell et al. ............. | 342/457 |
| 5,334,974 A | | 8/1994 | Simms et al. | |
| 5,550,551 A | * | 8/1996 | Alesio ........................ | 342/457 |
| 5,922,040 A | * | 7/1999 | Prabhakaran ............... | 701/117 |
| 6,240,365 B1 | * | 5/2001 | Bunn .......................... | 701/213 |
| 6,330,497 B1 | * | 12/2001 | Obradovich et al. .......... | 701/1 |
| 6,392,565 B1 | * | 5/2002 | Brown ........................ | 340/988 |

FOREIGN PATENT DOCUMENTS

| | | |
|---|---|---|
| DE | 195 12 074 A1 | 10/1996 |
| GB | 2 345 136 A | 6/2000 |
| WO | WO 94/26567 | 11/1994 |
| WO | WO 94/27395 | 11/1994 |

OTHER PUBLICATIONS

Machine Design, "Stolen Cars Phone Home", Sep. 6, 1990, pp. 78–79.

* cited by examiner

*Primary Examiner*—Theodore M. Blum
(74) *Attorney, Agent, or Firm*—Morgan, Lewis & Bockius LLP

(57) ABSTRACT

A vehicle tracking system, wherein with respect to vehicles owned by members on which communication units containing GPS receivers are mounted, the vehicle tracking system specifies a previously-registered member and the vehicle owned by the previously-registered member based upon a request of the previously-registered member for providing positional information of a vehicle owned by the previously-registered member, and the vehicle tracking system executes a polling operation of positional information to the vehicle owned by the previously-registered member; retrieves an existence position of the vehicle on a map from a map database based upon positional information transmitted from the vehicle owned by the previously-registered member; displays the existence position of the vehicle by superimposing on the map; and provides the existence position superimposed on the map as vehicle positional information data to the previously-registered member.

18 Claims, 16 Drawing Sheets

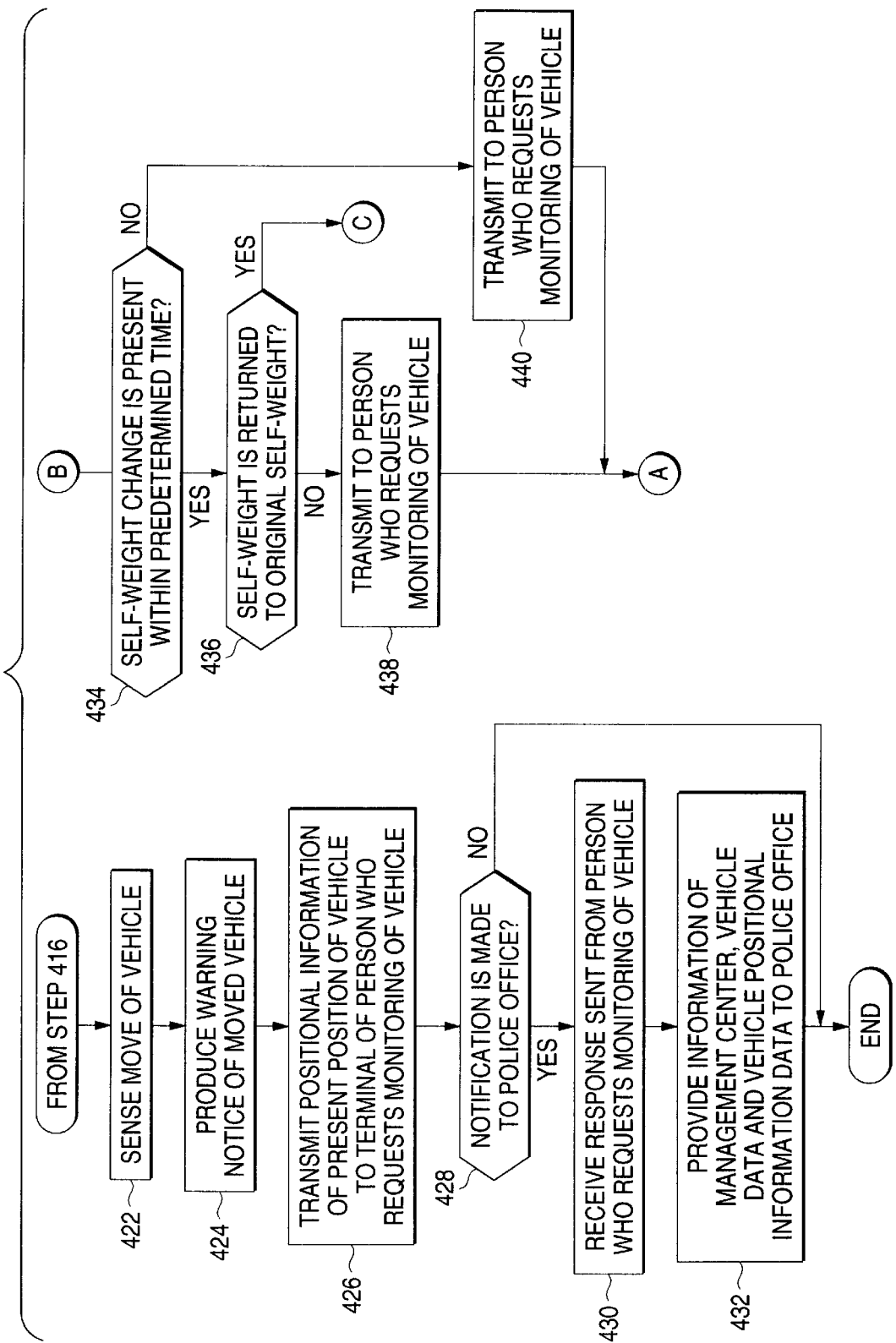

VEHICLE TRACKING SYSTEM, VEHICLE-THEFT WARNING SYSTEM, STOLEN-VEHICLE TRACKING SYSTEM, AND THEFT-WARNING VEHICLE TRACKING SYSTEM

BACKGROUND OF THE INVENTION

1. Field of the Invention

The present invention generally relates to a vehicle tracking system, a vehicle-theft warning system, and a theft-warning vehicle tracking system. More specifically, the present invention is directed to such a vehicle tracking system capable of retrieving a position of a vehicle to clarify the retrieved vehicle position on a map in such a case that an owner of the vehicle forgets a parked position of this vehicle, or an existence position of the own vehicle is unknown. Otherwise, in the case that a rental vehicle is employed, when an existence position of the rental vehicle is unknown since this rental vehicle is taken off at a place different from a scheduled place, the vehicle tracking system retrieves the present position of the rental vehicle to clearly indicate this position on the map. Also, while a person parks a vehicle at a specific position for a scheduled time duration, in such a case that this own vehicle is moved from the specific position before the scheduled time duration has elapsed, and/or in such a case that although a door of the vehicle is locked and further no passenger rides this vehicle, a certain weight is applied to this vehicle so that a self-weight of this vehicle is change, the vehicle-theft warning system notifies that this vehicle encounters with a car theft by producing a warning notice from this vehicle. More specifically, the present invention is directed to such a theft-warning vehicle tracking system. That is, while a vehicle is parked at a specific position for a preselected time duration, when this vehicle is moved from the specific position to be stolen before the preselected time duration has passed, and/or in such a case that although a door of a vehicle is locked and no passenger is present in this case, a certain weight is applied to this vehicle so that a self-weight of this vehicle is changed and a position of this vehicle is changed from a specific position, the theft-warning vehicle tracking system judges such a fact that this vehicle is stolen, performs a polling operation of the vehicle position in a short time interval, and then, clearly indicates the move position of this vehicle on a map, which is provided to an owner of this vehicle.

2. Related Art

Generally, as to vehicles, or automobiles, owners of the vehicles drive the vehicles for various purposes of shopping, sightseeing spots (pleasure parks), and travels. In a certain case, owners of vehicles may rent their vehicles to their acquaintances, or their friends. As explained above, while use fields of vehicles are more and more extended, a total number of vehicles driven in the domestic area would be considerably increased. In such a case that an owner of a vehicle rents his vehicle to his acquaintance, or his friend, if either the acquaintance or the friend communicates with this owner of the vehicle, then a present position of this vehicle can be clarified. To the contrary, if either the acquaintance or the friend gives no answer, then this vehicle owner is brought into such a condition that the present location of his vehicle cannot be completely grasped.

Also, in the case of a rental vehicle, there is no problem when person returns this rental vehicle to a predetermined place on the expiration day/time according to a rental-contract. In the contrary, if person does not return this rental vehicle to a predetermined place on the expiration day/time according to a rental-contract, then a present location of this rental vehicle cannot be grasped.

Furthermore, since owners of vehicles never continuously watch their vehicles for 24 hours, there are many possibilities that these vehicles are left at parking lots of shopping areas, parking lots of pleasure parks, parking areas of sightseeing spots, and outdoor areas. Under such circumstance, there are some possibilities that vehicles may encounter car-thefts. If vehicles may encounter such car-thefts, then no one knows where the stolen-vehicles are presently located.

Further, in the below-mentioned cases, for instance, a parking lot of a shopping area, a parking place of a pleasure park, and a parking area of a sightseeing spot, the owner realizes the vehicle actually encounters a car-theft when the vehicle encounters the car-theft and is moved from the parking area. However, this vehicle is not equipped with countermeasure for warning the vehicle owner while his vehicle is stolen.

Under such a condition that an owner of a vehicle cannot completely grasp where his vehicle is presently located, this vehicle could not be searched in the general art system. Also, in the case of a rental vehicle, if person does to return a rental vehicle to a predetermined place on an expiration day/time according to a rental-contract, then very cumbersome works are necessarily required in order to collect this rental vehicle.

Also, generally, even when such an abnormal condition (for example, owner encounters car-theft) happens to occur in a vehicle, since no notification capable of notifying such a car-theft is issued without sensing this abnormal condition, the owner cannot immediately take a proper measure.

Furthermore, in the case that a driver of a vehicle encounters with a theft of his parked vehicle, this vehicle driver may grasp this car-theft when the vehicle driver returns to this parked vehicle and actually sees the disappear of his parked vehicle. As a result, the vehicle owner cannot completely grasp where the stolen vehicle is presently located.

SUMMARY OF THE INVENTION

An object of the present invention is to provide a vehicle tracking system operable in such a manner that with respect to a member whose vehicle is a missing vehicle, an existence position of this missing vehicle can be supplied while being displayed on a map.

Another object of the present invention is to provide a vehicle tracking system capable of avoiding such an operation that a vehicle position map information is mistakenly supplied to a third party, while the vehicle position map information where an existence position of a missing vehicle owned by a member is displayed on a map is provided to such a member.

Another object of the present invention is to provide a vehicle tracking system operable in such a manner that while an existence position of a rental vehicle is automatically retrieved when a rental term is ended, the existence position of the rental vehicle can be supplied with being displayed on a map even in such a case that person does not take off the rental vehicle in a previously-set area at an expiration of this rental term according to a rental contract.

Another object of the present invention is to provide a stolen-vehicle warning system operable in such a way that in such a case that when a vehicle used by an owner is parked at a specific parking position for a scheduled time duration, if this vehicle is moved from the specific position before a predetermined time duration has passed, it is possible to notify such a fact that the vehicle is stolen, and/or, in such a case that even while a door of the vehicle is locked and therefore no passenger is present in this vehicle, if a certain weight is applied to this vehicle and thus a self-weight of this vehicle is changed, it is possible to notify such a car theft by producing a warning notice from this vehicle.

A further object of the present invention is to provide a stolen-vehicle tracking system operable in such a way that in such a case that when a vehicle used by an owner is parked at a specific parking position for a scheduled time duration, if this vehicle is moved from the specific position before a predetermined time duration has passed and then is stolen, a move position of this stolen vehicle can be clarified on a map in a periodic manner, and provided to the owner of this stolen vehicle.

A still further object of the present invention to provide a theft-warning vehicle tracking system operable in such a way that in such a case that even while a door of a vehicle is locked and therefore no passenger is present in this vehicle, if a certain weight is applied to this vehicle and thus a self-weight of this vehicle is changed, it is so judged that this vehicle is stolen, then it notices such a car theft by producing a warning notice from this vehicle, and then, while a polling operation of a vehicle position is carried out in a short time interval, and a move position of this stolen vehicle can be clearly indicated on a map and provided to this vehicle owner.

To achieve the above-explained objects of the present invention, a vehicle tracking system, as recited in first aspect of the present invention, is featured by such a vehicle tracking system wherein: with respect to vehicles owned by members, on which communication units containing GPS receivers are mounted, based upon a request of a previously-registered member for providing positional information of a vehicle owned by the previously-registered member, the vehicle tracking system specifies the previously-registered member and the vehicle owned by the previously-registered member; and also the vehicle tracking system executes a polling operation of positional information with respect to the vehicle owned by the previously-registered member; retrieves an existence position of the vehicle on a map from a map database based upon positional information transmitted from the vehicle owned by the previously-registered member; displays the existence position of the vehicle while being superimposed on the map; and provides the existence position superimposed on the map as vehicle positional information data to the previously-registered member.

Since the system is arranged by the above-explained structure, in accordance with the first aspect of the present invention, with respect to the member whose vehicle is the missing vehicle, the existence position of this missing vehicle can be supplied while being displayed on the map.

To achieve the above-explained objects of the present invention, a vehicle tracking system, as recited in a second aspect of the present invention, is featured by that the vehicle position information data to be provided to the previously-registered member is provided to a necessary governmental office such as a police station in response to a request issued from the previously-registered member.

Since the system is arranged by the above-explained structure, in accordance with the second aspect of the present invention, the process operation with respect to the car theft can be quickly and firmly carried out.

To achieve the above-explained objects of the present invention, a vehicle tracking system, as recited in a third aspect of the present invention, is featured by that while a back-up power supply is connected to the communication unit containing the GPS receiver, the positional information is automatically transmitted from a vehicle by interrupting a power supply circuit of the vehicle.

Since the system is arranged by the above-explained structure, in accordance with the third aspect of the present invention, even when the member does not request to provide the positional information of the own vehicle, the positional information data can be automatically started to be transmitted while using the abnormal condition of the vehicle as the trigger, and thus, the position of the vehicle can be sent to the management center.

To achieve the above-explained objects of the present invention, a vehicle tracking system, as recited in a fourth aspect of the present invention, is featured by such a vehicle tracking system wherein: with respect to rental vehicles on which communication units containing GPS receivers are mounted, while receiving an end of a rental term of a rental vehicle, the vehicle tracking system specifies the rental vehicle based upon vehicle data transmitted from the rental vehicle; executes a polling operation of position information to the rental vehicle; retrieves an existence position of the vehicle on a map from a map database based upon positional information transmitted from the rental vehicle; displays the existence position of the rental vehicle while being superimposed on the map; and acquires vehicle positional information data.

Since the system is arranged by the above-explained structure, in accordance with the fourth aspect of the present invention, while the existence position of the rental vehicle is automatically retrieved when the rental term is ended, the existence position of the rental vehicle can be supplied with being displayed on the map even in such a case that the rental contract making person does not take off the rental vehicle in a previously-set area at the end of this rental term.

To achieve the above-explained objects of the present invention, a vehicle tracking system, as recited in a fifth aspect of the present invention, is featured by that the vehicle positional information data is provided to a rental company.

Since the system is arranged by the above-explained structure, in accordance with the fifth aspect of the present invention, the rental company can readily grasp the existence areas of all of the rental vehicles owned by this rental company, while this rental company itself need not search these rental vehicles.

To achieve the above-explained objects of the present invention, a vehicle tracking system, as recited in a sixth aspect of the present invention, is featured by that the vehicle position information data to be provided to the rental company is provided to a necessary governmental office such as a police station in response to a request issued from the rental company.

Since the system is arranged by the above-explained structure, according to the sixth aspect of the present invention, the proper process operation can be quickly and firmly carried out with respect to the illegal use of the rental vehicle contract person.

To achieve the above-explained objects of the present invention, a vehicle tracking system, as recited in a seventh aspect of the present invention, is featured by that while a back-up power supply is connected to the communication unit containing the GPS receiver, the positional information is automatically transmitted from a rental vehicle by interrupting a power supply circuit of the rental vehicle.

Since the system is arranged by the above-explained structure, in accordance with the seventh aspect of the present invention, when the back-up power supply of the communication unit containing the GPS receiver is actuated due to the occurrence of the abnormal condition of the vehicle, this abnormal operation (car theft etc.) of the vehicle can be detected and the positional information of this vehicle can be transmitted to the management center. As a result, even when the member cannot become aware of the abnormal condition (car theft etc.) of the own vehicle, this member can grasp the positional information of this vehicle in the proper manner.

To achieve the above-explained objects of the present invention, a vehicle tracking system, as recited in an eight aspect of the present invention, is featured by such a vehicle tracking system wherein: with respect to vehicles owned by members, on which communication units containing GPS receivers are mounted, when a request for providing positional information as to a vehicle owned by a member which has previously been registered into a management company by specifying a member code is transmitted to the management company, while the member code is applied thereto, the positional information providing request is transmitted to the management company and also transmitted to a map distribution company; the management company specifies the member and also specifies the vehicle owned by the member based upon the vehicle positional information providing request, and also executes a polling operation of the positional information with respect to the vehicle owned by the member; the management company transmits a result of the polling operation of the positional information with respect to the vehicle owned by the member to the map distribution company, while applying thereto the member code; and in the case that a transmission code of the vehicle positional information providing request transmitted from the member is made coincident with a transmission code of the vehicle positional information providing request transmitted from the management company, the map distribution company retrieves an existence position of the vehicle on a map from a map database based upon the positional information of the vehicle owned by the vehicle, which is transmitted from the management company; displays the existence position of the vehicle, while being superimposed on the map; and also transmits the resultant existence position of the vehicle as vehicle positional information to the member.

Since the system is arranged by the above-explained structure, according to the eighth aspect of the present invention, it is possible to avoid such an operation that the vehicle position map information is mistakenly supplied to the third party, while the vehicle position map information where the existence position of the missing vehicle owned by the member is displayed on the map is provided to such a member.

Also, in order to achieve the above-described objects of the present invention, a vehicle-theft warning system, as recited in a ninth aspect of the present invention, is featured by such a vehicle-theft warning system wherein: with respect to vehicles owned by members, on which communication units containing GPS receivers are mounted, based upon a move monitoring request issued from a terminal of a previously-registered member by inputting an ID code, a vehicle number of a vehicle owned by the previously-registered member, and parking time, the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered; retrieves/stores an existence position of the vehicle on a map from a map database based upon the positional information transmitted from the vehicle owned by the previously-registered; and also produces a warning notice by employing an electronic appliance mounted on the vehicle in such a case that the existence position of the vehicle is changed within the parking time which is previously registered by the member.

Since the system is arranged by the above-explained structure, in accordance with the ninth aspect of the present invention, in such a case that when the vehicle owned by the member is parked at the specific parking position for a predetermined time duration, this vehicle is moved from the specific position before the predetermined time duration has passed, it is possible to notify such a fact that the vehicle is stolen, while the warning notice is issued from this stolen vehicle.

Also, in order to achieve the above-described objects of the present invention, a vehicle-theft warning system, as recited in a tenth aspect of the present invention, is featured by that the warning notice made by employing the on-vehicle electronic appliance is realized by tuning ON/OFF a lamp, or by actuating a horn.

Also, in order to achieve the above-described objects of the present invention, a stolen-vehicle tracking system, as recited in an eleventh aspect of the present invention, is featured by such a stolen-vehicle tracking system wherein: with respect to vehicles owned by members, on which communication units containing GPS receivers are mounted, based upon a move monitoring request issued from a terminal of a previously-registered member by inputting an ID code, a vehicle number of a vehicle owned by the previously-registered member, and parking time, the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered; retrieves/stores an existence position of the vehicle on a map from a map database based upon the positional information transmitted from the vehicle owned by the previously-registered; and notifies a move of a vehicle position to the terminal of the previously-registered when the existence position of the vehicle is changed within the parking time which is previously registered by the member; and also displays the existence position of the vehicle on the terminal of the member, while being superimposed on the map, whereby present vehicle position information data is provided to the previously-registered member.

Since the system is arranged by the above-explained structure, in accordance with the eleventh aspect of the present invention, in such a case that when the vehicle owned by the member is parked at the specific parking position for a predetermined time duration, this vehicle is moved from the specific position before the predetermined time duration has passed, and then is stolen, the move position of this stolen vehicle can be clarified on the map in the periodic manner, which can be provided to the owner of this stolen vehicle.

Also, in order to achieve the above-described objects of the present invention, a stolen-vehicle tracking system, as recited in a twelfth aspect of the present invention, is featured by that the terminal of the member is an I-mode portable telephone, or a PC (personal computer).

Since the system is arranged by the above-explained structure, according to the twelfth aspect of the present invention, even where the owner of the stolen vehicle is located, the stolen-vehicle tracking information can be sequentially provided.

Also, in order to achieve the above-described objects of the present invention, a stolen-vehicle tracking system, as recited in a thirteenth aspect of the present invention, is featured by that the vehicle position information data to be provided to the previously-registered member is provided to a necessary governmental office such as a police station in response to a request issued from the previously-registered member.

Since the system is arranged by the above-explained structure, in accordance with the thirteenth aspect of the present invention, the proper process operation can be quickly and firmly carried out with respect to the person who has stolen the vehicle.

Also, in order to achieve the above-described objects of the present invention, a stolen-vehicle warning system, as recited in a fourteenth aspect of the present invention, is featured by such a vehicle-theft warning system wherein: with respect to vehicles owned by members, on which communication units containing GPS receivers are mounted, based upon a move monitoring request issued from a terminal of a previously-registered member by inputting an ID code, a vehicle number of a vehicle owned by the previously-registered member, and parking time, the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered; retrieves/stores an existence position of the vehicle on a map from a map database based upon the positional information transmitted from the vehicle owned by the previously-registered; and also produces a warning notice by employing an electronic appliance mounted on the vehicle in such a case that a passenger of the vehicle takes off the vehicle and locks a door thereof, and thereafter, a self-weight of the vehicle is changed.

Since the system is arranged by the above-explained structure, in accordance with the fourteenth aspect of the present invention, in such a case that even while the door of the vehicle is locked and therefore no passenger is present in this vehicle, a certain weight is applied to this vehicle and thus the self-weight of this vehicle is changed, it is possible to notify such a car theft by producing the warning notice from this vehicle.

Also, in order to achieve the above-described objects of the present invention, a stolen-vehicle warning system, as recited in a fifteenth aspect of the present invention, is featured by such the warning notice made by employing the on-vehicle electronic appliance is realized by turning ON/OFF a lamp, or by actuating a horn.

Since the system is arranged by the above-explained structure, according to the fifteenth aspect of the present invention, such a fact that the vehicle encounters with the theft can be surely notified to persons who are present near this stolen vehicle.

Further, in order to achieve the above-explained objects of the present invention, a theft-warning vehicle tracking system, as recited in a sixteenth aspect of the present invention, is featured by such a theft-warning vehicle tracking system wherein: with respect to vehicles owned by members, on which communication units containing GPS receivers are mounted, based upon a move monitoring request issued from a terminal of a previously-registered member by inputting an ID code, a vehicle number of a vehicle owned by the previously-registered member, and parking time, the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered; retrieves/stores an existence position of the vehicle on a map from a map database based upon the positional information transmitted from the vehicle owned by the previously-registered; notifies a change in vehicle weights to the terminal of the previously-registered member in the case that a passenger of the vehicle takes of the vehicle and locks a door thereof, and thereafter, a self-weight of the vehicle is changed; notifies a move of a vehicle position to the terminal of the member in such a case that an existence position of the vehicle is changed from a parking position which is previously registered by the previously-registered member; and also displays the existence position of the vehicle on the terminal of the member, while superimposing the existence position on a map, whereby present vehicle positional information data to the previously-registered member.

Since the system is arranged by the above-explained structure, in accordance with the sixteenth aspect of the present invention, in such a case that even while the door of the vehicle is locked and therefore no passenger is present in this vehicle, a certain weight is applied to this vehicle and thus the self-weight of this vehicle is changed, it is possible to notify such a car theft by producing the warning notice from this vehicle, while it is so judged that this vehicle is stolen. Then, while the polling operation of the vehicle position is carried out in a short time interval, the move position of this stolen vehicle can be clearly indicated on the map, which may be provided to this vehicle owner.

Further, in order to achieve the above-explained objects of the present invention, a theft-warning vehicle tracking system, as recited in a seventeenth aspect of the present invention, is featured by that the terminal of the member is an I-mode portable telephone, or a PC (personal computer).

Since the system is arranged by the above-explained structure, according to the seventeenth aspect of the present invention, even where the owner of the stolen vehicle is located, the stolen-vehicle tracking information can be sequentially provided.

Moreover, in order to achieve the above-explained objects of the present invention, a theft-warning vehicle tracking system, as recited in an eighteenth aspect of the present invention, is featured by that the vehicle position information data to be provided to the previously-registered member is provided to a necessary governmental office such as a police station in response to a request issued from the previously-registered member.

Since the system is arranged by the above-explained structure, in accordance with the eighteenth of the present invention, the proper process operation can be quickly and firmly carried out with respect to the person who has stolen the vehicle.

BRIEF DESCRIPTION OF THE DRAWINGS

For a better understanding of the present invention, reference is made of a detailed description to be read in conjunction with the accompanying drawings, in which:

FIG. 17 is a flow chart for explaining operations executed on the management center side of both the vehicle-theft warning system capable of notifying the move of the vehicle, and the stolen-vehicle tracking system capable of notifying the stolen vehicle, according to the present invention.

DETAILED DESCRIPTION OF THE PREFERRED EMBODIMENTS

Referring now to drawings, various preferred embodiments of the present invention will be described in detail.

Information Transmission/Reception Relationship in Vehicle Tracking System

Figure 1:
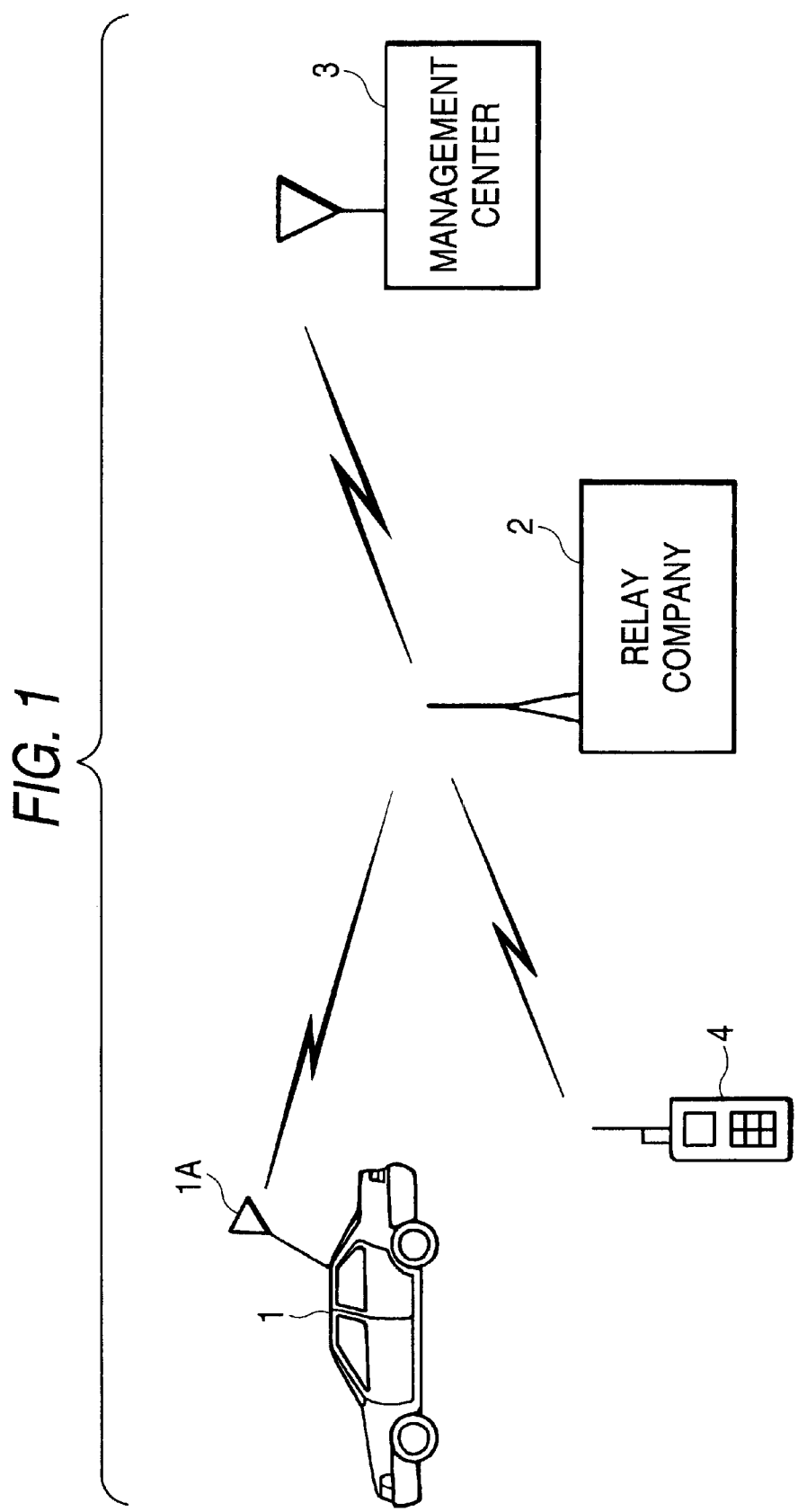
FIG. 1 is a diagram for illustratively showing a data transmission/reception relationship used to exemplify a vehicle tracking system according to an embodiment of the present invention.

FIG. 1 illustratively shows an information transmission/reception relationship used to effect a vehicle tracking system according to the embodiment of the present invention.

In the drawing, a vehicle 1 is able to communicate with a management center 3 via a relay company 2 through a communication line such as a telephone line. Various information is communicated between this vehicle 1 and the management center 3. That is, information is transmitted from an on-vehicle electronic appliance of this vehicle 1 through an antenna 1A thereof to the relay company 2, and then, the information received by the relay company 2 is transmitted from this relay company 2 to an antenna of this management center 3. In the case that presence of a vehicle owned by a member is unknown, this member may request the management center 3 by using a portable telephone 4 via the relay company 2 to provide a present position of this missing vehicle via the relay company 2 by displaying on a map.

Figure 2:
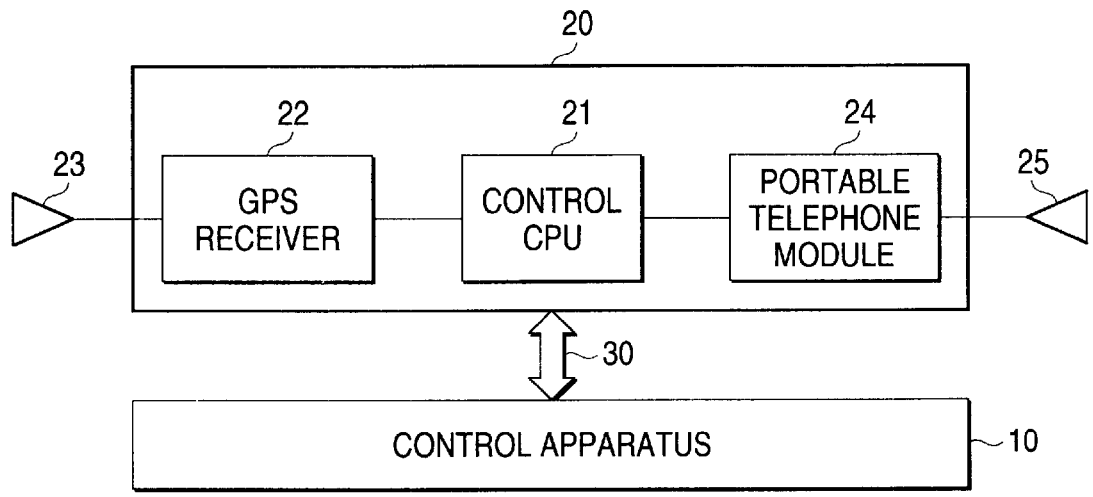
FIG. 2 is a block diagram for schematically indicating an arrangement of an on-vehicle electronic appliance of an embodiment mode, for realizing the vehicle tracking system capable of supplying a present position of this missing vehicle being displayed on a map with respect to a member who owns this missing vehicle.

FIG. 2 schematically represents an arrangement of anon-vehicle electronic appliance of the vehicle 1, which is used to embody a vehicle tracking (surveying) system capable of supplying a present position of a missing vehicle to a member having an own vehicle, the presence of which is unknown, by displaying this present position on a map.

In this drawing, a communication unit 20 containing a GPS (global positioning system) receiver is connected via a bus line 30 to a control apparatus 10 constituted by a CPU (central processing unit). This communication unit 20 containing the GPS receiver is arranged by a control CPU 21, a GPS receiver 22, and a portable telephone module 24. In other words, both the GPS receiver 22 which receives positional information of a vehicle on a map via an antenna 23, and the portable telephone module 24 are connected to the control CPU 21 of the communication unit 20 containing the GPS receiver. The positional information entered from the GPS receiver 22 may be transmitted via the antenna 25 to the management center 3. Then, this control CPU 21 may transmit to and receive data from the control apparatus 10. The control CPU 21 is driven by a signal supplied from the control apparatus 10, this control CPU 21 may receive the positional information of the vehicle from the GPS receiver 22 via the antenna 23, may fetch the positional information to the control apparatus 10, and may transmit the positional information via the antenna 25 to the control center 3.

The control unit 20 containing the GPS receiver, which is arranged by this control CPU 21, the GPS receiver 22, and the portable telephone module 24, is provided in such a manner that this communication unit 20 is built in a meter (not shown) into which the control apparatus 10 is contained. Since the communication unit 20 containing this GPS receiver is built in the meter, a position of such a vehicle which mounts the communication unit 20 containing this GPS receiver can be identified, or specified.

Figure 3:
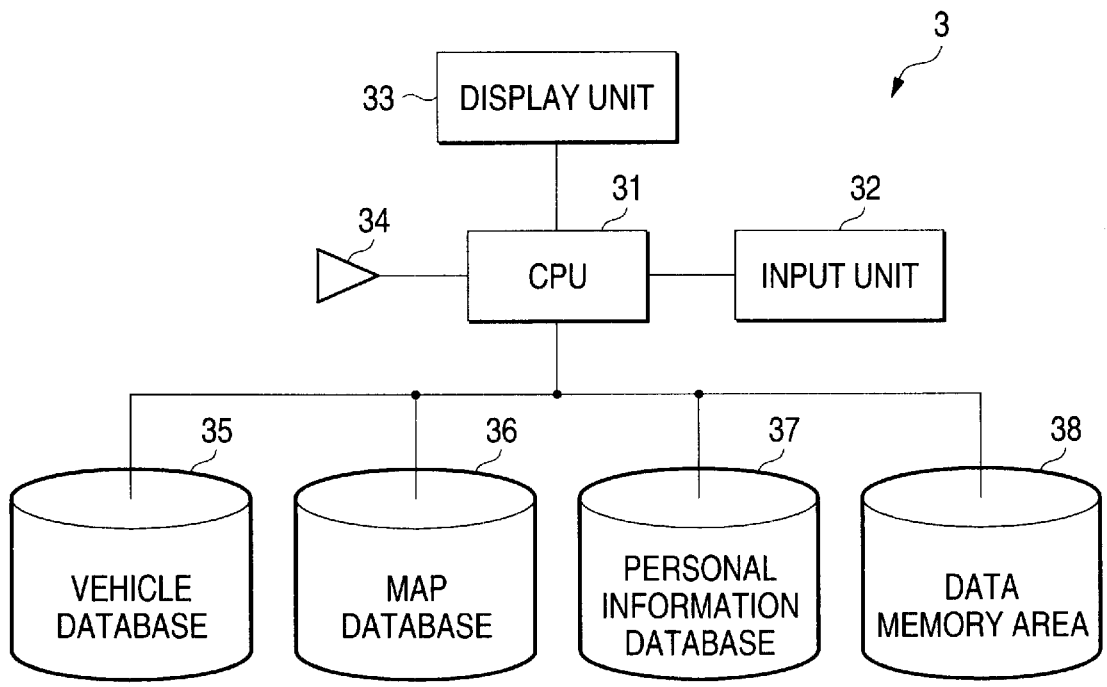
FIG. 3 is a schematic block diagram for indicating an arrangement of a management center shown in FIG. 1.

On the other hand, the management center 3 contains such an arrangement as shown in FIG. 3. A CPU 31 is connected to a memory apparatus. This memory apparatus includes a vehicle database 35, a map database 36, a personal information database 37, and a data memory area 38. An input unit (for example, keyboard) 32 used for inputting various sorts of data is connected to this CPU 31. An antenna 34 is connected to this CPU 31. The CPU 31 has a function capable of receiving by using this antenna 34 such a vehicle information transmitted from the on-vehicle electronic appliance of the vehicle 1 through the relay company 2. A display unit (for example, display) 33 is connected to this CPU 31. The CPU 31 has another function capable of displaying the vehicle information received by this CPU 31, which is transmitted from the on-vehicle electronic appliance of the vehicle.

In the vehicle database 35, information of vehicles (vehicle data) owned by members who have been registered is stored in the database format. It should be understood that in this case, a membership system is not necessarily required, but members are merely registered as vehicle users. As this vehicle data, the following items of members are registered, namely, portable telephone numbers of communication units containing GPS receivers; names of vehicle makers; vehicle models/types; engine displacement volumes (for example, 3,000 cubic centimeters), vehicle grades (for instance, VIP), install/non-install of car navigation apparatus; install/non-install of sun-roof; body colors of vehicles (for instance white body color); dates of first vehicle registration; vehicle registration numbers; body serial numbers of vehicles etc. These vehicle data have been registered in this vehicle database 35 in connection with the respective members.

Also, the map database 36 corresponds to such data capable of covering an entire region of a country and capable of displaying a specific area in detail and may be displayed in an enlarged size, a compressed size, and a scroll mode. In addition, the personal information database 37 stores thereinto personal information of members (namely, persons who have been registered as users). The personal information includes ID codes, present addresses, personal names, ages, sexes, driver's license dates, types of driver's licenses, driver's license numbers, driver's histories, driver's offices, contactable destinations of members, telephone numbers, and the like.

The vehicle tracking (surveying) system with employment of the above-described arrangement may be operated in the case that such a request is made from a member who owns a missing vehicle (namely, present location of his vehicle is unknown). This request is to provide data as to the present location of the vehicle owned by this member. When a present position of a vehicle owned by a member is unknown, the following cases may be conceived. That is, a member want to know where the stolen vehicle of this member is presently located, and a member wants to know where the own vehicle rented to his acquaintance, or friend is presently located.

Figure 4:
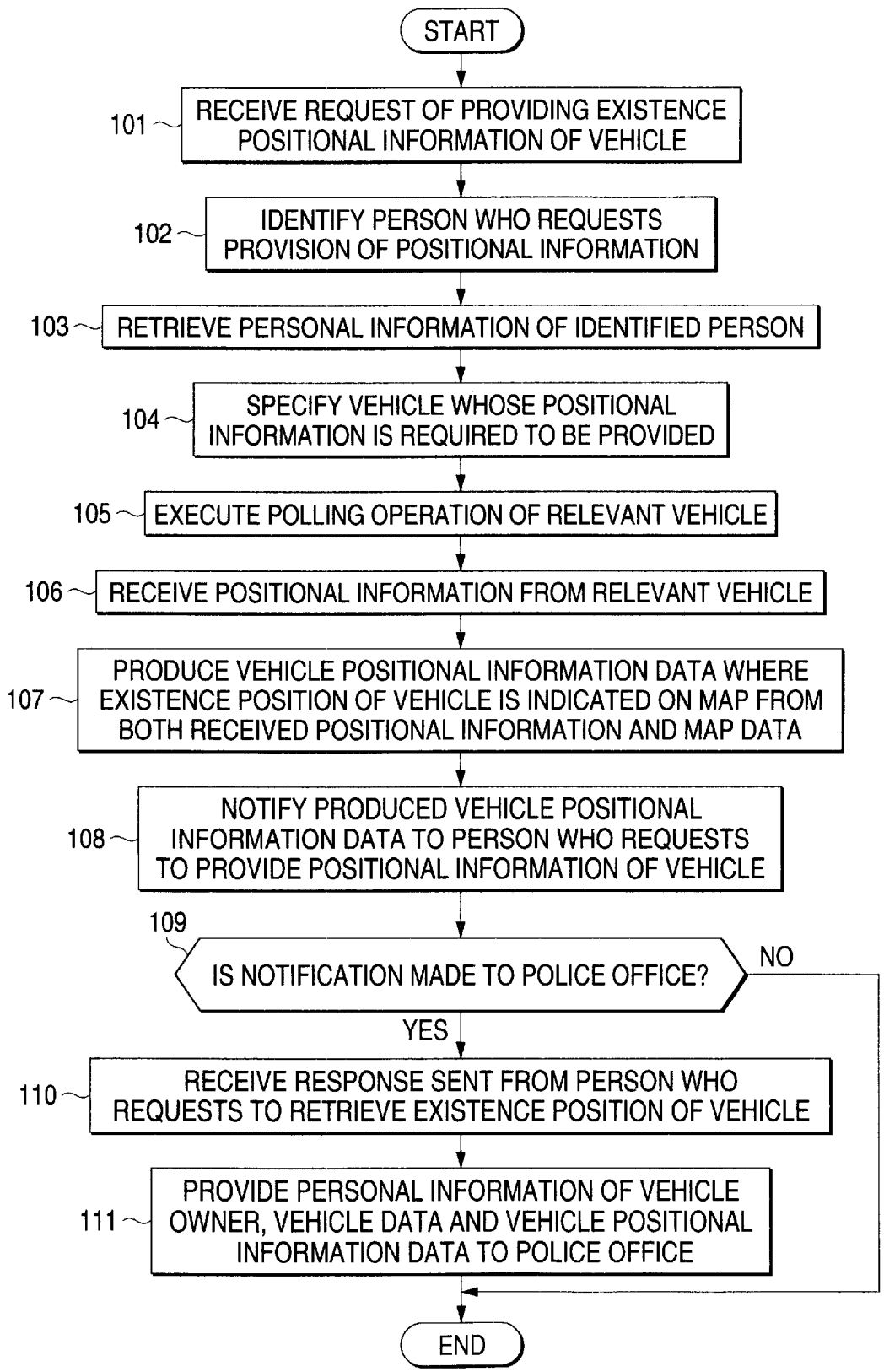
FIG. 4 is a flow chart for describing flow operations of a management center in the vehicle tracking system capable of supplying the present position of the missing vehicle being displayed on the map with respect to the member who owns this missing vehicle.

Referring now to a flow chart shown in FIG. 4, a description will be made of operations of the management center 3 in the case that this member requests the management center 3 to provide such a data indicative of the present position of the vehicle owned by this member.

Vehicle Positional Data Provided by Management Center

First, when a member requests the management center 3 to provide data indicative of a present position of the own vehicle, the management center 3 receives the request of providing the information about the present location of the vehicle (step 101). The reception of the request to provide the information about the present location of this vehicle implies an acceptance of such an information providing request made by a telephone call of this request person. When the request of providing the information as to the present position of the vehicle is received at this step 101, the management center 3 confirms a request making person who requests to provide such present position data of the own vehicle by using the personal information database 37 (step 102) (namely, confirmation of authorized person). This confirmation of the authorized person is to confirm that this request making person is equal to the authorized member (person who has been registered as authorized user). At this step 102, when no confirmation of this request making person is carried out (namely, person who is not registered as authorized user), the management center 3 sends to the request making person, such a message that his request of providing the present position information of the vehicle cannot be accepted.

When the authorized person confirmation can be carried out at this step 102, the management center 3 retrieves personal information as to the confirmed request making person by employing the personal information database 37 (step 103). When the retrieving operation of the personal information of the request making person is carried out at this step 103, the management center 3 retrieves an objective vehicle (namely, vehicle which is requested to be searched) of the member who requests to provide the present position information of the vehicle by using the vehicle database 35, and then, specifies the objective vehicle (step 104). As a result, the management center 3 can recognize such a fact that the member who requests to provide the present position information of the vehicle corresponds to which person, and also the registered vehicle owned by the member corresponds to which vehicle. To specify this vehicle, the following items are especially required, namely, the name of the vehicle maker, the vehicle model/type, the displacement volume, the vehicle grade, the body color of this vehicle, the registration number, and the portable telephone number of the communication unit containing the GPS receiver.

When the vehicle specifying operation is carried out at this step 104, since the vehicle of the member can be specified and also the portable telephone number of the communication unit 20 containing the GPS receiver can be revealed, the management center 3 polls the positional information of the vehicles of the members.

This polling operation of the positional information is performed as the following manners. That is, a telephone call is made by the CPU 31 of the management center 3 via the relay company 2 to the portable telephone module 24 of the communication unit which builds therein the GPS receiver of the vehicle 1 specified by using the antenna 34, the management center 3 is connected to this communication unit 20 containing the GPS receiver of the vehicle 1 via the communication line, the control CPU 21 of the communication unit 20 containing the GPS receiver of the vehicle 1 is driven so as to obtain the positional information of the vehicle 1. When the management center 3 integrates the vehicle 1 of the member about the positional information, the control CPU 21 of the communication unit 20 containing the GPS receiver of the vehicle 1 receives the positional information from the GPS receiver 22, and transmits the positional information via the portable telephone module 24 to the management center 3.

When the polling operation of the positional information is performed from the management center 3 to the vehicles of the members of this step 105, the management center 3 receives the positional information data which is transmitted from the vehicle 1 of the member who interrogates the positional information (step 106).

When the positional information data of the vehicle 1 owned by the member is received (step 106), the management center 3 retrieves a map for covering the present position of the vehicle 1 from the map database 36 based upon the positional information data which is received from the on-vehicle electronic appliance of the vehicle 1, and then forms such vehicle positional information data in which the existence position of the vehicle is displayed on the map in such a manner that the present position of the vehicle 1 is superimposed on this map (step 107). When the vehicle positional information data is formed at this step 107, the management center 3 notifies this formed vehicle positional information data with respect to the person (member) who requests to provide the positional information of the vehicle (step 108). Since this vehicle positional information data is notified, the member can recognize where the vehicle 1 owned by this member is located.

When the vehicle positional information data formed at this step 108 is communicated, the management center 3 interrogates as to whether or not a notification is made of a police station (relevant governmental office) based upon the acquired vehicle positional information data as a result of the polling operation to the vehicle 1. It should be understood that this interrogation to the police station is not required for such a case that since a member rents his vehicle to an acquaintance, or a friend and could not receive any notification of his acquaintance/friend, a present position of this vehicle is unknown. However, in the case that the missing vehicle may be caused by a criminal case such as a car theft, the vehicle owner may have a better solution such that the police station searches this missing vehicle.

When the management station 3 receives such an answer from the member who has requested to retrieve the present position of the own vehicle that no notification is carried out to the police station (step 109), this operation flow is ended. To the contrary, when such a response carried out from the member who has requested to retrieve the present position of the own vehicle that a notification is made of the police station (step 109), the management station 3 receives such an answer from this member who has requested to retrieve the present position of the own vehicle that the notification is carried out to the police station (step 110), this management station 3 notifies the stolen car of this member to the police station, and further, provides the personal information of this vehicle owner (member), the vehicle data of the vehicle to be searched, and the positional information data of the vehicle to be searched (step 111). Then, this process operation is ended.

Another On-Vehicle Electronic Appliance of Vehicle Tracking System

Figure 5:
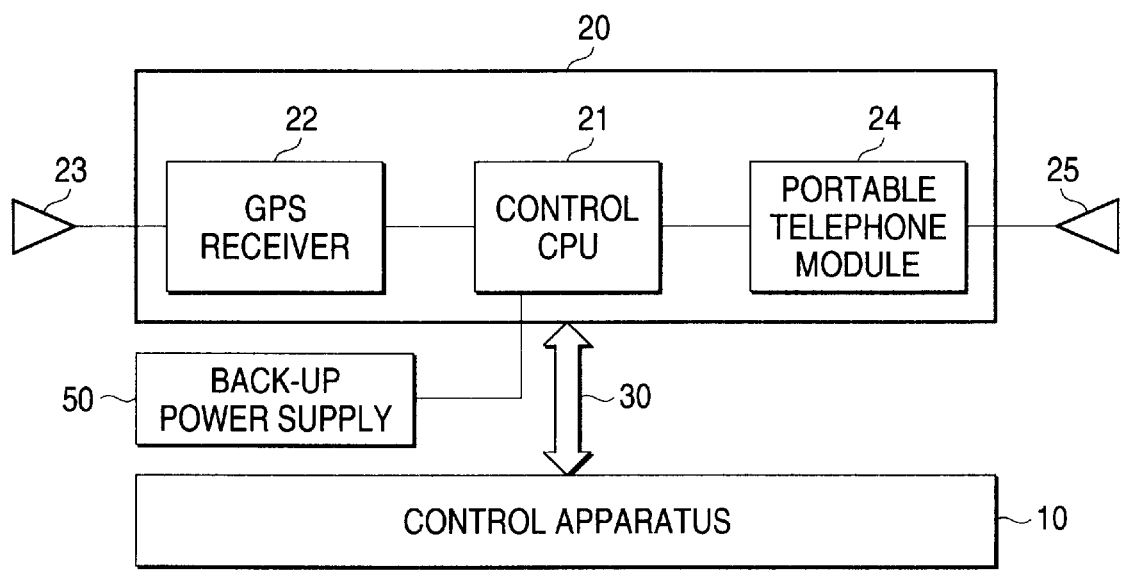
FIG. 5 is a block diagram for schematically indicating an arrangement of an on-vehicle electronic appliance of another embodiment mode for realizing the vehicle tracking system capable of supplying the present position of the missing vehicle being displayed in the map with respect to the member who owns this missing vehicle.

FIG. 5 schematically represents an arrangement of an on-vehicle electronic appliance according to another embodiment mode of the vehicle 1, which is used to embody a vehicle tracking (surveying) system capable of supplying a present position of a missing vehicle of a member having the own vehicle, the presence of which is unknown, by displaying the present position of this missing vehicle on a map.

In this drawing, this on-vehicle electornic appliance has the below-mentioned technical different point from that of the on-vehicle electronic appliance shown in FIG. 2. That is to say, in the embodiment mode of FIG. 2, when the vehicle 1 encounters with an abnormal operation (car theft by interrupting power supply circuit of vehicle 1, and air bag is actuated etc.), and thus, the supply of electric power to the communication unit 20 containing the GPS receiver is interrupted, this communication unit 20 containing the GPS receiver cannot be subsequently operated. As a result, the data capable of notifying the vehicle position can be no longer transmitted to the management center 3. In contrast, in accordance with this embodiment mode of FIG. 5, since a back-up power supply 50 is mounted to the control CPU 21 of the communication unit 20 containing the GPS receiver (alternatively, back-up power supply may be built in communication unit 20 containing GPS receiver), when the vehicle 1 encounters with an abnormal operation (car theft by interrupting power supply circuit of vehicle 1, and air bag is actuated etc.), this back-up power supply 50 is actuated. The actuation of this back-up power supply 50 is used as a trigger operation, and the communication unit 20 containing the GPS receiver can be continuously operated. Therefore, even when a member does not request to provide position information of the own vehicle, the present position of this missing vehicle is transmitted to the management center 3 by actuating the back-up power supply 50 mounted on this communication unit 20 while the abnormal operation of the vehicle is used as the trigger action. As a result, the management center 3 can sense such a fact that the abnormal condition happens to occur in the vehicle 1, and furthermore, such a data capable of notifying as to where the vehicle 1 is presently located can be transmitted to the management center 3. Other arrangements of this on-vehicle electronic appliance shown in FIG. 5 are the same as those of the on-vehicle electronic appliance shown in FIG. 2.

Arrangement of Another Vehicle Tracking System

Figure 6:
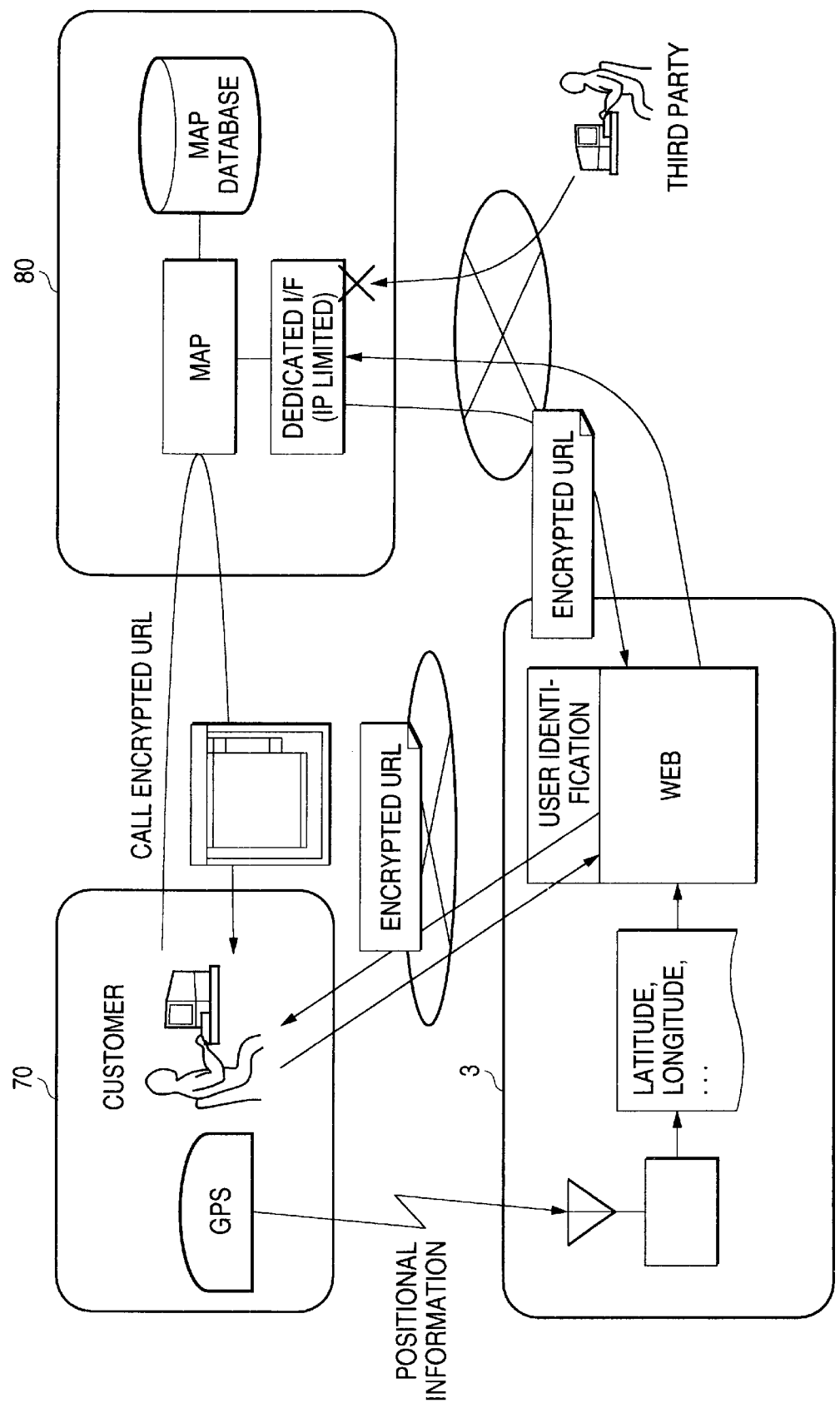
FIG. 6 is a diagram for illustratively indicating another data/transmission/reception relationship used to exemplify the vehicle tracking system of the present invention.

FIG. 6 schematically represents an arrangement of a vehicle tracking system capable of supplying a present location of a missing vehicle by being displayed on a map with respect to such a member who owns this vehicle.

In this drawing, while a member 70 requests a management center (management company) 3 to provide positional information of a vehicle own by this member 70, on which a communication unit containing a GPS receiver is mounted by using a terminal appliance such as a PC (personal computer). When the provision of this vehicle positional information is requested to the management center 3, a member code allocated to the member 70 is applied thereto. In the case that this member 70 transmits the request of providing the positional information of the own vehicle with applying the own member code to the management center (management company) 3 by the terminal appliance such as the PC, such request signal data of providing this vehicle positional information is transmitted to a map distribution company 80 while the same member code is automatically applied thereto. This request signal data of providing the vehicle positional information to which the member code has been applied and which has been transmitted, is stored into a database of the map distribution company 80. This map distribution company 80 has a map database. This map database may be such map data capable of covering an entire area of a country and also capable of displaying a specific area thereof in detail in an enlarge/compression mode and a scroll mode.

Figure 7:
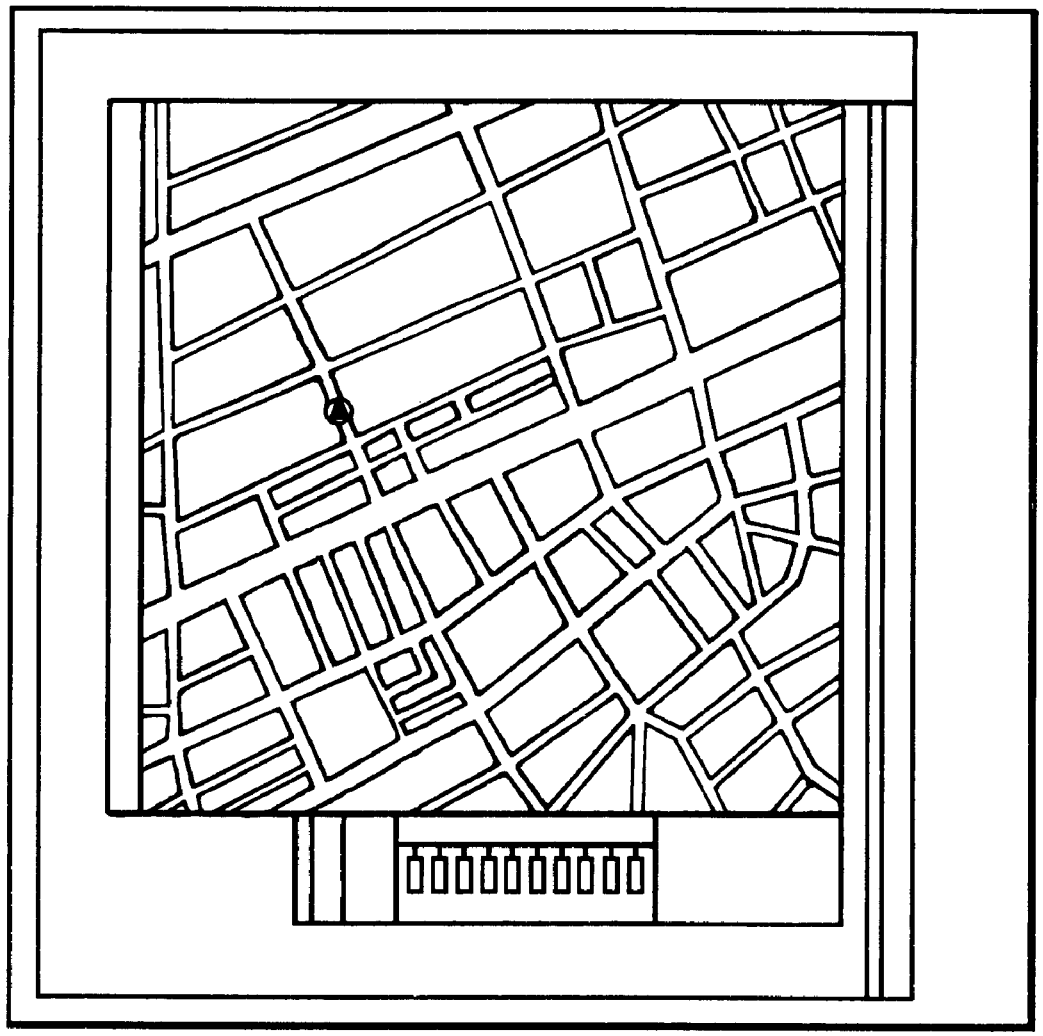
FIG. 7 is a diagram for representing a map on which a vehicle location is superimposed in the vehicle tracking system of FIG. 6.

Also, this map distribution company 80 has the following function: That is, when the management center (management company) 3 receives a result of polling operation of positional information performed to the vehicle owned by this member in combination with the member code, this map distribution company 80 reads out map information near the present position of the vehicle owned by this member from the map database, and displays the present position of this vehicle based upon the positional information of the vehicle owned by this member, which is transmitted from the management center (management company) 3, in such a manner that this positional information is superimposed on a map (see FIG. 7). Then, the map distribution company 80 sends the superimposed data as vehicle positional information data to the member. When the vehicle positional information data is transferred to the member, such a member code which is applied to the request signal data of providing the vehicle positional information and is sent from the member 70 by using the terminal appliance such as the PC is required to be coincident with such a member code which is applied to the transmission data for requesting the provision of the vehicle positional information and is transmitted from the management center (management company) 3. As a consequence, it can be avoided to erroneously supply such a vehicle positional map information to a third party. This vehicle positional map information is made by displaying on the map, the present location of the vehicle which is requested to be searched by the member.

On the other hand, the management center (management company) 3 contains a memory apparatus. This memory apparatus includes a vehicle database, a personal information database, and a data memory area. Also, an input unit (for example, keyboard) for inputting various sorts of data is connected to a CPU 31 owned by the management center 3. Furthermore, an antenna is connected to this CPU, the CPU has a function capable of receiving by using this antenna such a vehicle positional information transmitted from the on-vehicle electronic appliance of the vehicle 1 through the relay company 2, and a function capable of communicating with the map distribution company 80. A display unit (for example, display) is connected to this CPU, the CPU has another function capable of displaying the vehicle information of the vehicle 1 received by this CPU, which is transmitted from the on-vehicle electronic appliance of the vehicle, the member code of the member 70 received from the terminal electronic appliance such as the PC, and the vehicle information sent via the relay company 2 from the on-vehicle electronic appliance of the vehicle 1.

Into the vehicle database of the memory apparatus of the management center (management company) 3, information of vehicles (vehicle data) owned by members who have been registered is stored in the database format. It should be understood that in this case, a membership system is not necessarily required, but members are merely registered as vehicle users. The following items of members are registered as this vehicle data, namely, portable telephone numbers of communication units containing GPS receivers; names of vehicle makers; vehicle models/types; engine displacement volumes (for example, 3,000 cubic centimeters), vehicle grades (for instance, VIP), install/non-install of car navigation apparatus; install/non-install of sun-roofs; body colors of vehicles (for instance white body color); dates of first vehicle registration; vehicle registration numbers; body serial numbers of vehicles etc. These vehicle data have been registered in this vehicle database 35 in connection with the respective members.

The personal information database of the memory apparatus employed in the management center (management company) 3 stores thereinto personal information of members (namely, persons who have been registered as users) The personal information includes ID codes, present addresses, personal names, ages, sexes, driver's license dates, types of driver's licenses, driver's license numbers, driver's histories, driver's offices, contactable destinations of members, telephone numbers, and the like.

When the management center (management company) 3 receives the positional information providing request of the vehicle to which the member code allocated to the member 70 is added by using the terminal appliance such as the PC from this member 70 (this vehicle mounts thereon communication unit containing the own GPS receiver), this management center 3 may specify such a member who has requested to provide the vehicle positional information based upon the member data stored in the personal information database of the memory apparatus of the management center (management company) 3. Also, this management center 3 may specify such a vehicle owned by this member who has requested to provide the vehicle positional information based upon the member data stored in the personal information database of the memory apparatus of the management center (management company) 3, and also, this management center 3 may execute a polling operation of positional information with respect to the vehicle owned by this member. The management center 3 transmits a result of this polling operation to the map distribution company 80, while the member code is applied thereto.

The vehicle tracking system equipped with the above-described arrangement may be operated in the case that such a request is made from a member who owns a missing vehicle (namely, present location of his vehicle is unknown). This request is to provide data as to the present location of the vehicle owned by this member.

Figure 8:
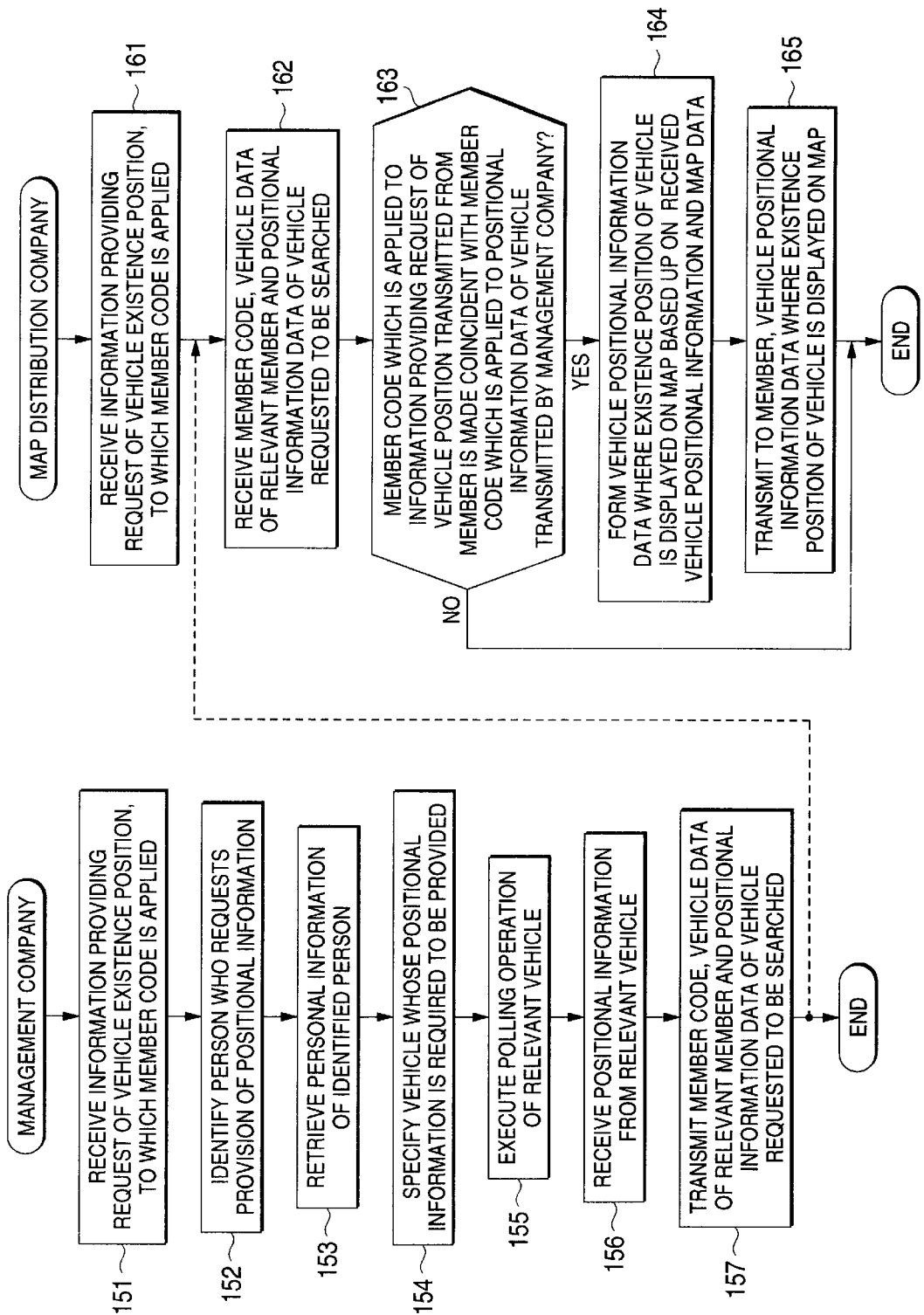
FIG. 8 is a flow chart of describing operations of both the management center and the map distribution company employed in the vehicle tracking system shown in FIG. 6, capable of supplying a present position of a missing vehicle being displayed on the map with respect to a member who owns this missing vehicle.

When a present position of a vehicle owned by a member is unknown, the following cases may be conceived. That is, a member wants to know where the stolen vehicle of this member is presently located, and a member wants to know where the own vehicle rented to his acquaintance, or friend is presently located. Referring now to a flow chart shown in FIG. 8, a description will be made of operations of the management center (management company) 3 and the map distribution company 80 in the case that this member requests the management center 3 to provide such a data indicative of the present position of the vehicle owned by this member.

Vehicle Positional Data Provided by Management Center/Map Distribution Company

First, when a member requests the management center (management company) 3 to provide data indicative of a present position of the own vehicle, the management center 3 receives the request of providing the information about the present location of the vehicle, while a member code (ID code numbers allocated to respective members) is applied to this request (step 151). This information providing request signal data of the present position of the vehicle to which this member code is applied is simultaneously transmitted to the map distribution company 80 without being informed to the member (step 161). The reception of the request to provide the information about the present location of this vehicle implies an acceptance of such an information providing request made by a telephone call of this request person. When the request of providing the information as to the present position of the vehicle is received at the step 151, the management center (management company) 3 confirms a request making person who requests to provide such present position data of the own vehicle by using the personal information database (step 152) (namely, confirmation of authorized person). This confirmation of the authorized person is to confirm that this request making person is equal to the authorized member (person who has been registered as authorized user). At this step 152, when no confirmation of this request making person can be carried out (namely, person who is not registered as authorized user), the management center (management company) 3 sends to the request making person, such a message that his request of providing the present position information of the vehicle cannot be accepted.

When the authorized-person confirmation operation can be carried out at this step 152, the management center (management company) 3 retrieves personal information as to the confirmed request making person by employing the personal information database (step 153). When the retrieving operation of the personal information of the request making person is carried out at the step 153, the management center (management company) 3 retrieves an objective vehicle (namely, vehicle which is requested to be searched) of the member who requests to provide the present position information of the vehicle by using the vehicle database, and then, specifies the objective vehicle (step 154). As a result, the management center (management company) 3 can recognize such a fact that the member who requests to provide the present position information of the vehicle corresponds to which person, and also the registered vehicle owned by the member corresponds to which vehicle. To specify this vehicle, the following items are especially required, namely, the name of the vehicle maker, the vehicle model/type, the displacement volume, the vehicle grade, the body color of this vehicle, the registration number, and the portable telephone number of the communication unit containing the GPS receiver.

When the vehicle specifying operation is carried out at the step 154, since the vehicle of the member can be specified and also the portable telephone number of the communication unit containing the GPS receiver can be revealed, the management center (management company) 3 polls the positional information of the vehicles of the members (step 155). This polling operation of the positional information implies that the positional information of the vehicle is interrogated in accordance with the following manners. That is, while a telephone call is made by the CPU of the management center (management company) 3 via the relay company 2 to the portable telephone module of the communication unit which builds therein the GPS receiver of the vehicle 1 specified by using the antenna so as to connect the management center (management company) 3 to this communication unit containing the GPS receiver of the vehicle 1 via the communication line, the control CPU of the communication unit containing the GPS receiver of the vehicle 1 is driven so as to interrogate the positional information of the vehicle 1. When the positional information is interrogated from this management center (management company) 3 to the vehicle 1 of the member, the control CPU of the communication unit containing the GPS receiver of the vehicle 1 receives the positional information from the GPS receiver, and transmits the positional information via the portable telephone module to the management center (management company) 3.

When the polling operation of the positional information is performed from the management center (management company) 3 to the vehicles of the members (step 155), the management center (management company) 3 receives the positional information data which is transmitted from the vehicle 1 of the member who interrogates the positional information (step 156). When the positional information data of the vehicle 1 owned by the member is received at this step 156, the management center (management company) 3 transmits to the map distribution company 80 (step 157), the member code retrieved from the member data stored in the personal information database, the vehicle data retrieved from the member data stored in the personal information database, and also the positional information data based upon the polling operation of the vehicle which is required to be retrieved (searched), while the member code is applied thereto.

When the map distribution company 80 receives the positional information data based upon the polling operation of the vehicle transmitted from the management center (managing company) 3 with the member code being applied (step 162), this map distribution company 80 judges as to whether or not the member code which is applied to the vehicle position information providing request transmitted from the member is made coincident with the member code which is applied to the vehicle position information providing request transmitted from the management center (management company) 3. In the case that the map distribution company 80 judges such that the member code applied to the vehicle position information providing request transmitted from the member is not made coincident with the member code applied to the vehicle position information providing request transmitted from the management center (management company) 3, this flow operation is ended (namely, provision of positional information of vehicle to be searched is not performed) (step 163). To the contrary, at this step 163, the map distribution company 80 judges that the member code applied to the vehicle position information providing request transmitted from the member is made coincident with the member code applied to the vehicle position information providing request transmitted from the management center (management company) 3, this map distribution company 80 retrieves a map near the present position of the vehicle from the map database based upon the positional information data of the vehicle 1 received from the management center (management company) 3, and then, produces vehicle positional information data in which the present position of the vehicle 1 is superimposed on this searched map and is displayed thereon (step 164). When the vehicle positional information data is formed at this step 164, the map distribution company 80 transmits such a vehicle positional information data that the present position of the vehicle 1 is superimposed on the formed map and the existence position of the vehicle is displayed on the map (step 165). Then, this process operation is ended. Since this vehicle positional information is transmitted, the member can recognize where the own vehicle 1 is presently located.

Arrangement of Third On-Vehicle Electronic Appliance

Figure 9:
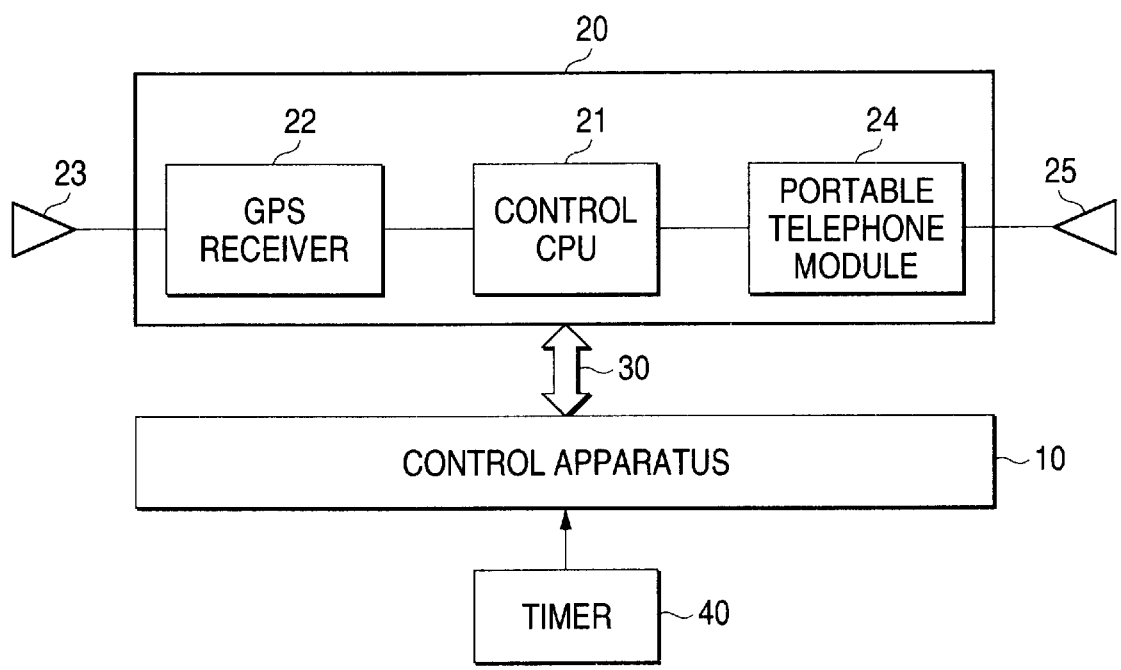
FIG. 9 is a schematic block diagram for indicating an arrangement of an on-vehicle electronic appliance of a vehicle, used to realize a vehicle tracking system capable of supplying a present position of a rental vehicle being displayed on a map when a rental contract term is completed.

FIG. 9 schematically shows an arrangement of an on-vehicle electronic appliance used to realize such a vehicle tracking system capable of supplying an existence position of a rental vehicle (rented car), while this existence position is displayed on a map, when a rental contact term is ended.

In this drawing, a communication unit 20 containing a GPS (global positioning system) receiver is connected via a bus line 30 to a control apparatus 10 constituted by a CPU (central processing unit). This communication unit 20 containing the GPS receiver is identical to the communication unit 20 containing the GPS receiver shown in FIG. 2, and is arranged by a control CPU 21, a GPS receiver 22, and a portable telephone module 24. In other words, both the GPS receiver 22 which receives positional information of a vehicle on a map, and the portable telephone module 24 are connected to the control CPU 21 of the communication unit 20 containing the GPS receiver. The positional information entered from the GPS receiver 22 may be transmitted via the antenna 25 to the management center 3. Then, this control CPU 21 may transmit and receive data with respect to the control apparatus 10. While the control CPU 21 is driven by a signal supplied from the control apparatus 10, this control CPU 21 may receive the positional information of the vehicle from the GPS receiver 22 via the antenna 23, may fetch the positional information to the control apparatus 10, and may transmit the positional information via the antenna 25 to the control center 3.

A timer 40 is connected to this control apparatus 10. When this timer 40 is actuated, an operation signal of the time 40 is outputted to the control apparatus 10. The control apparatus 10 executes such a control operation that even when a key switch is set to a position of "ON", an engine of the vehicle cannot be actuated (namely, a self-starter motor is not turned ON). As explained above, when a rental contract is established by defining a rental term (for example, 3 rental days), the timer 40 of the rental vehicle is set. When this rental term is ended, the timer 40 is actuated, and then, the key switch is forcibly turned OFF, so that the engine of this rental vehicle cannot be started. Also, even in such a case that the rental term is ended while the engine is actuated when the rental term is ended, there is no possibility that the engine under actuation is stopped due to ending of the rental term. However, in the case that the rental term is accomplished while the engine is actuated, the control apparatus 10 performs the following control operation. That is, if the engine key is turned OFF after the rental term is expired and thus the engine is stopped, then the engine cannot be again actuated even when this engine is thereafter tried to be restarted (namely, even when key switch is set to ON position).

Operation of Management Center When Rental Term is Ended

Figure 10:
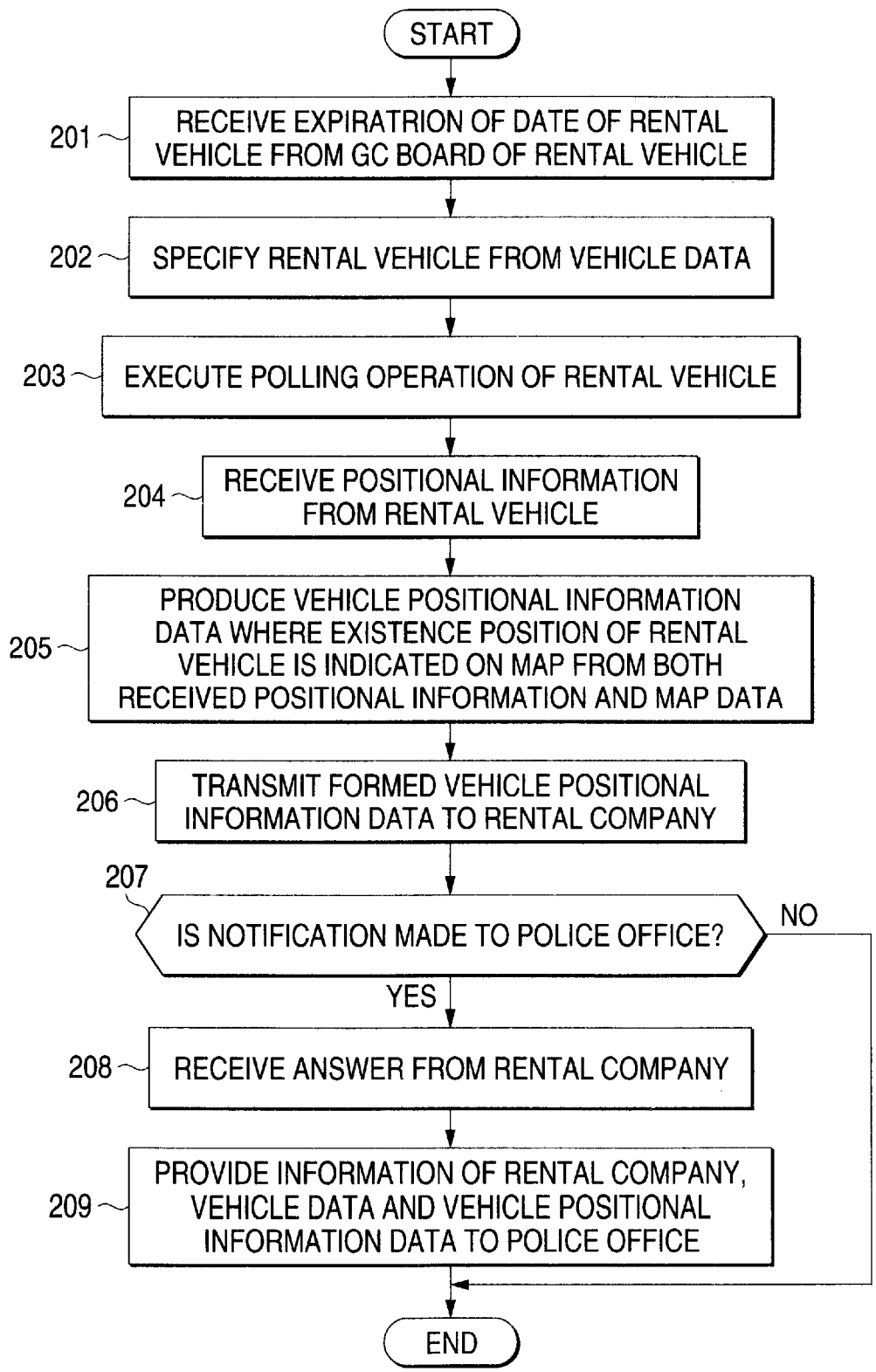
FIG. 10 is a flow chart for explaining operation of the management center of the vehicle tracking system capable of supplying the present position of the rental vehicle being displayed on the map when the rental contract term is completed.

The vehicle tracking system with employment of the above-described arrangement is operated in such a case that an existence position of a rental vehicle is confirmed when a rental term is ended. Referring now to a flow chart of FIG. 10, operations of the management center 3 executed when the rental term is accomplished will be described.

First, when the rental term of the rental vehicle is ended (for instance, when rental-contracted day of vehicle has passed, or when rental-contracted hour of vehicle has passed), the timer 40 connected to the control apparatus 10 is actuated on the side of the on-vehicle electronic appliance which is mounted on the rental vehicle, so that such a signal indicative of an end of this rental term is supplied to the control apparatus 10. When this control apparatus 10 receives the rental term ending signal, the control apparatus 10 turns OFF a drive signal for driving the engine, which is supplied to a vehicle driver. In response to the actuation signal of this timer 40, the control apparatus 10 drives the control CPU 21 of the communication unit 20 containing the GPS receiver so as to transmit the rental term end signal via the portable telephone module 24 and the antenna 25 to the management center 3. As a result, the management center 3 receives the rental term end signal which is transmitted from the on-vehicle electronic appliance of the rental vehicle by way of a telephone call issued from the portable telephone module 24 of the communication unit 20 containing the GPS receiver of this rental vehicle (step 201). When the rental term end signal is received at this step 201, the CPU 32 senses the telephone number of the communication unit 20 containing the GPS receiver of this rental vehicle from the telephone call made from the portable telephone module 24 of the communication unit 20 containing the GPS receiver of this rental vehicle (step 202). Then, the CPU 31 specifies such a rental vehicle stored in the vehicle database 35 of the memory apparatus based upon the telephone number of the communication unit 20 containing the GPS receiver of this rental vehicle. This specifying operation of the rental vehicle may be carried out by specifying a rental contract person, a car maker name of a rental vehicle, a model/type of this rental vehicle, a displacement volume of this rental vehicle, a vehicle grade, a body color of the rental vehicle, a registration number of the rental vehicle, and a portable telephone number of a communication unit containing a GPS receiver.

When the specifying operation of the rental vehicle is carried out at this step 202, the management center 3 executes the polling operation of the positional information with respect to the rental vehicle based upon the sensed portable telephone number of the communication unit containing the GPS receiver (step 203). This positional information polling operation implies the following operation. That is, the CPU 31 of the management center 3 makes a telephone call via the relay company 24 to the portable telephone module 24 of the communication unit 24 containing the GPS receiver of the rental vehicle 1 which is specified by using the antenna 34, and thus, the CPU 31 connects the management center 3 to the communication unit 20 containing the GPS receiver of the vehicle via a communication line, and drives the control CPU 21 of the communication unit 20 containing the GPS receiver of the vehicle 1 so as to interrogate the positional information of the rental vehicle 1. When the positional information is interrogated from this management center 3 to the rental vehicle 1, the control CPU 21 of the communication 21 containing the GPS receiver of this rental vehicle receives the positional information from the GPS receiver 22, and then, transmits this positional information via the portable telephone module 24 to the management center 3.

When the management center 3 performs the polling operation of the positional information with respect to the rental vehicle 1 at this step 203, this management center 3 receives positional information data sent from such a rental vehicle 1 to which the positional information is interrogated at a step 204. When the positional information data of the rental vehicle 1 is received at this step 204, at the next step 205, the management center 3 retrieves a map near a present position of the rental vehicle 1 from the map database 36 based upon the positional information data received from the on-vehicle electronic appliance of the rental vehicle 1, and then, superimposes the present position of the rental vehicle 1 on this retrieved map, so that this management center 3 produces vehicle positional information data in which the existence position of the rental vehicle 1 is displayed on the map. When the vehicle positional information data is formed at this step 205, the management center 3 sends the formed vehicle positional data to a rental company at a step 206. In such a case that this management center 3 corresponds to this rental company, the transmission of the vehicle positional information data to the rental company at this step 206 is no longer required. Since this vehicle positional information data is transmitted, the rental company may grasp where the own rental vehicle 1 is presently located.

When the transmission of the vehicle positional information data formed at the step 206 is carried out, the management center 3 interrogates as to whether or not a notification is made to a police station (relevant government office) based upon the vehicle positional information data acquired as a result of the polling operation to the rental vehicle 1 at a step 207. This interrogation as to the notification to the police station with respect to this rental company is made based upon one judgement reference, namely, whether or not a serious damage is given to the rental company, since a rental contact making person uses a rental vehicle by violating this contract rule. In other words, the rental company may judge that it is better to make a confirmation of a vehicle by a police station as to a free ride of a rental contract making person.

When the rental company answers that no notification is made of the police station at this step 207, this process flow is accomplished. To the contrary, when the rental company answers that a notification should be made of the police station at this step 207, the management center 3 receives such a response from the rental company that the notification should be made of the police station. At a next step 209, this management center 3 notifies to the police station, such a fact that the rental vehicle is used in the illegal manner and is left, and furthermore, provides the information of the rental company, the vehicle data of the rental vehicle, and the positional information data of the rental vehicle. Then, this operation flow is accomplished.

Another On-Vehicle Electronic Appliance of Vehicle Tracking System

Figure 11:
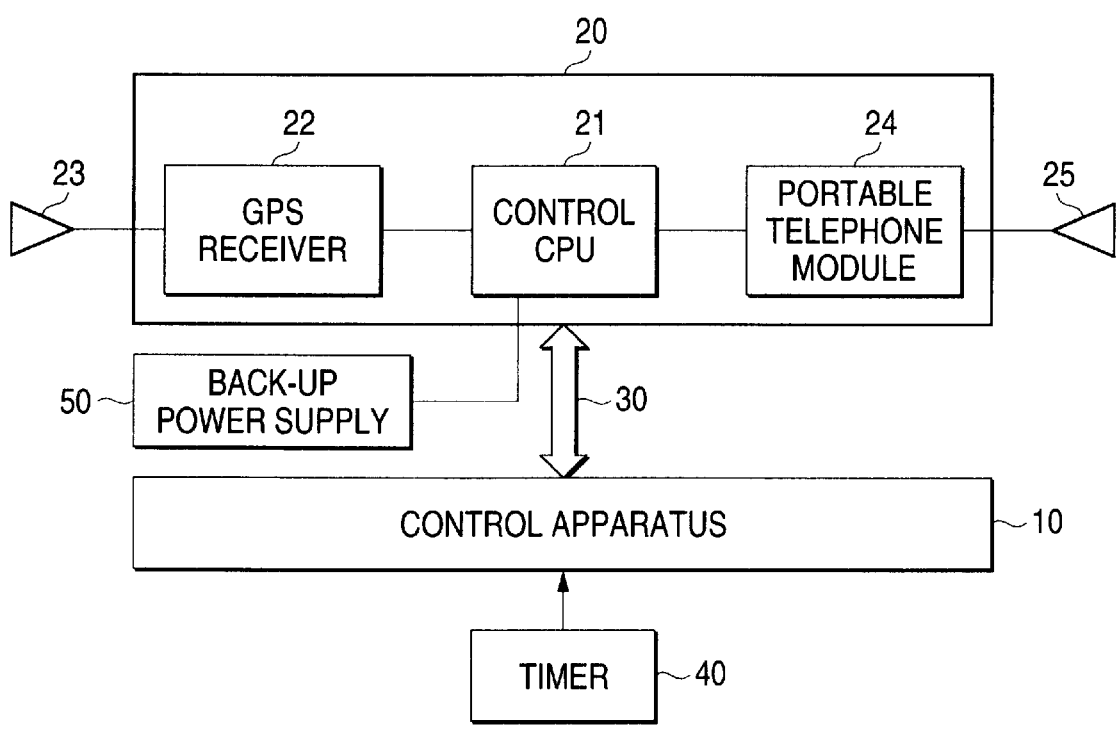
FIG. 11 is a block diagram for schematically indicating an arrangement of an on-vehicle electronic appliance of a further embodiment mode for realizing the vehicle tracking system capable of supplying the present position of the missing vehicle being displayed on the map with respect to the member who ows this missing vehicle.

FIG. 11 schematically represents an arrangement of an on-vehicle electronic appliance according to another embodiment mode of the vehicle 1, which is used to embody a vehicle tracking (surveying) system capable of supplying a present position of a rental vehicle when a rental term is ended, while the present position of this missing vehicle is displayed on a map.

In this drawing, this on-vehicle electronic appliance has the below-mentioned technical different point from that of the on-vehicle electronic appliance shown in FIG. 9. That is to say, in the embodiment mode of FIG. 9, when the rental vehicle 1 encounters with an abnormal operation (car theft by interrupting power supply circuit of vehicle 1, and air bag is actuated etc.), and thus, the supply of electric power to the communication unit 20 containing the GPS receiver is interrupted, this communication unit 20 containing the GPS receiver cannot be subsequently operated. As a result, the data capable of notifying the vehicle position can be no longer transmitted to the management center 3. In contrast, in accordance with this embodiment mode of FIG. 11, while a back-up power supply (separate body type of adaptor power supply) 50 is mounted to the control CPU 21 of the communication unit 20 containing the GPS receiver (alternatively, back-up power supply may be built in communication unit 20 containing GPS receiver), when the vehicle 1 senses an abnormal condition of the rental vehicle 1 (car theft by interrupting power supply circuit of vehicle 1, and air bag is actuated etc.), the communication unit 20 containing the GPS receiver can be operated without waiting for the actuation of the timer 40. Subsequently, even when the interruption of the power supply circuit is continued, the data for notifying the vehicle position can be transmitted to the management center 3 (for example, rental company). Other arrangements of this on-vehicle electronic appliance shown in FIG. 11 are the same as those of the on-vehicle electronic appliance shown in FIG. 9.

As previously described, in the case of this embodiment mode, when the rental vehicle encounters with the abnormal condition (namely, rental vehicle encounters with vehicle theft by interrupting power supply circuit of rental vehicle, and air bag is actuated), the present position of the rental vehicle is notified to the management center 3 (for example, rental company) by operating the back-up power supply 50 mounted on this rental vehicle, while the occurrence of this abnormal condition is used as the trigger.

Figure 12:
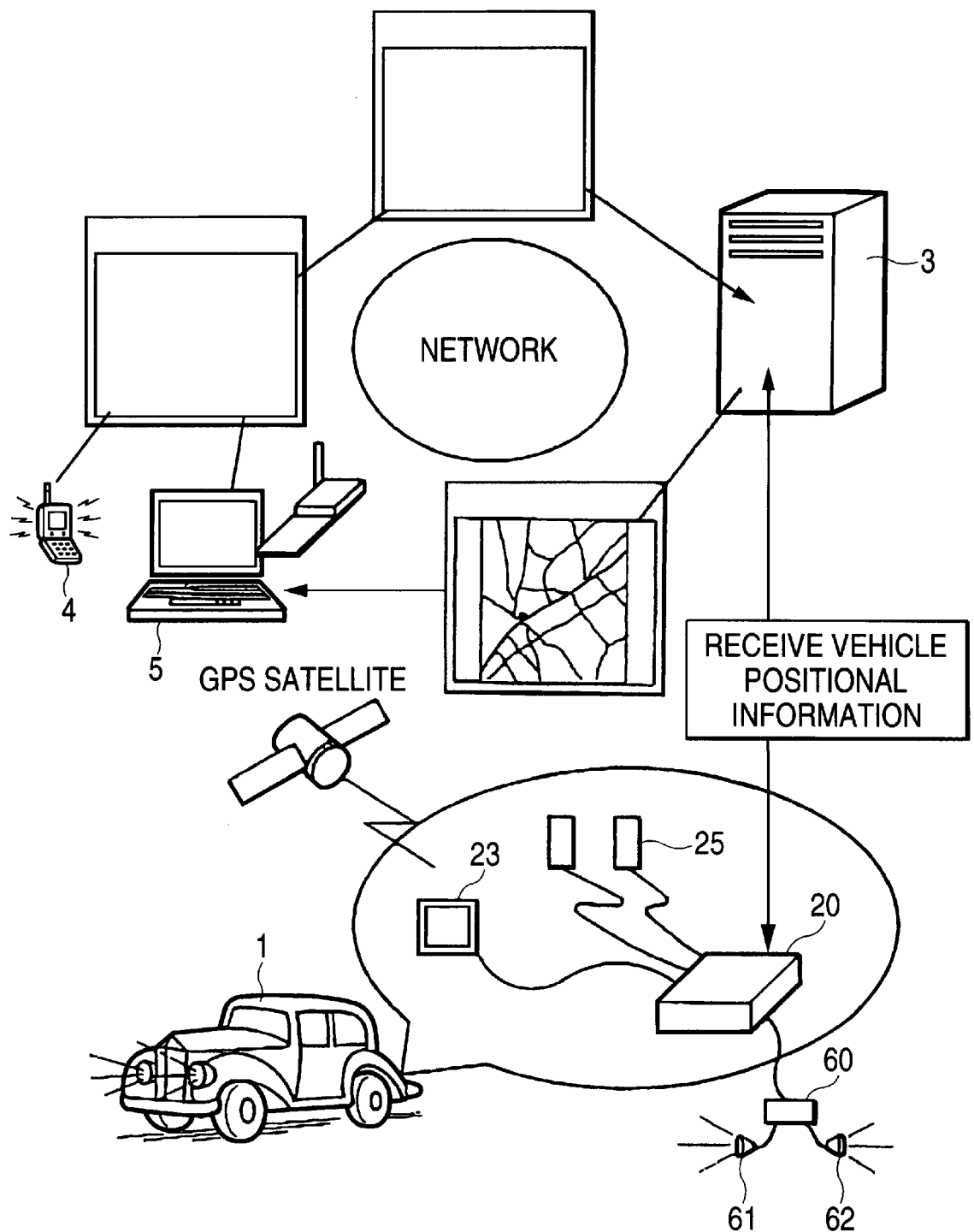
FIG. 12 illustratively shows a data transmission/reception relationship used to exemplify a vehicle-theft warning system capable of notifying a move of a vehicle, and a stolen-vehicle tracking system capable of notifying a stolen vehicle, according to the present invention.

Information Transmission/Reception Relationship in Vehicle-Theft Warning System and Stolen-vehicle Tracking System FIG. 12 illustratively shows an information transmission/reception relationship used to exemplify a vehicle-theft warning system and a stolen-vehicle tracking system, according to an embodiment mode of the present invention.

In the drawing, a vehicle 1 on which a communication unit 20 containing a GPS receiver is mounted is able to communicate with a management center 3 via a relay company 2 through a communication line such as a telephone line. Various information is communicated between this vehicle 1 and the management center 3. That is, positional information is transmitted from a non-vehicle electronic appliance (communication unit 20) of this vehicle 1 through an antenna 25 thereof to management center 3. In the case that a member requests to monitor a move of the vehicle 1 own by this member, on which such a communication unit 20 containing the GPS receiver is mounted, the member parks this vehicle 1, and thereafter, enters an ID code capable of specifying this member by manipulating either a portable telephone 4 or a user PC 5 so as to connect to the management center 3 via the Internet. After this Internet connection is accomplished, the member firstly inputs a vehicle number of the vehicle 1 which is requested to br monitored as to the move of this vehicle 1 so as to specify the move-monitoring vehicle, and furthermore, enters scheduled parking time so as to request the move monitoring operation of the specified vehicle owned this member. This vehicle number of the vehicle 1 corresponds to such a registration number which has been registered in a governmental office, concretely speaking, a number displayed on a number plate of this vehicle. Both the information of this move monitoring subject vehicle and the scheduled parking time are stored into a vehicle database 35 of the management center 3.

When the member requests to monitor the move of this specific vehicle, the management center 3 is communicated with the communication unit 20 mounted on the vehicle 1 in order to specify the move monitoring subject vehicle and also to specify a parking position of this vehicle 1, and then fetches the positional information acquired by the GPS receiver of the communication unit 20 employed in the vehicle 1 to store this fetched positional information. This stored position of the vehicle 1 may constitute a reference of a move monitoring operation. This move monitoring operation of the vehicle 1 is continuously carried out for a time duration corresponding to the scheduled parking time which is entered by the member. In other words, during the scheduled parking time entered by the member, the management center 3 is communicated with the communication unit 20 mounted on the vehicle 1 in a periodic manner so as to acquire the positional information from the vehicle 1. Also, this management center 3 compares this acquired position of the vehicle 1 with the firstly stored position of the vehicle 1. When an identification can be made between these positions, the management center 3 recognizes no abnormal condition. To the contrary, when the management center 3 compares the acquired position of the vehicle 1 with the firstly stored position of the vehicle 1, if there is no coincidence between these positions, then the management center 3 judges the occurrence of the abnormal condition.

Figure 13:
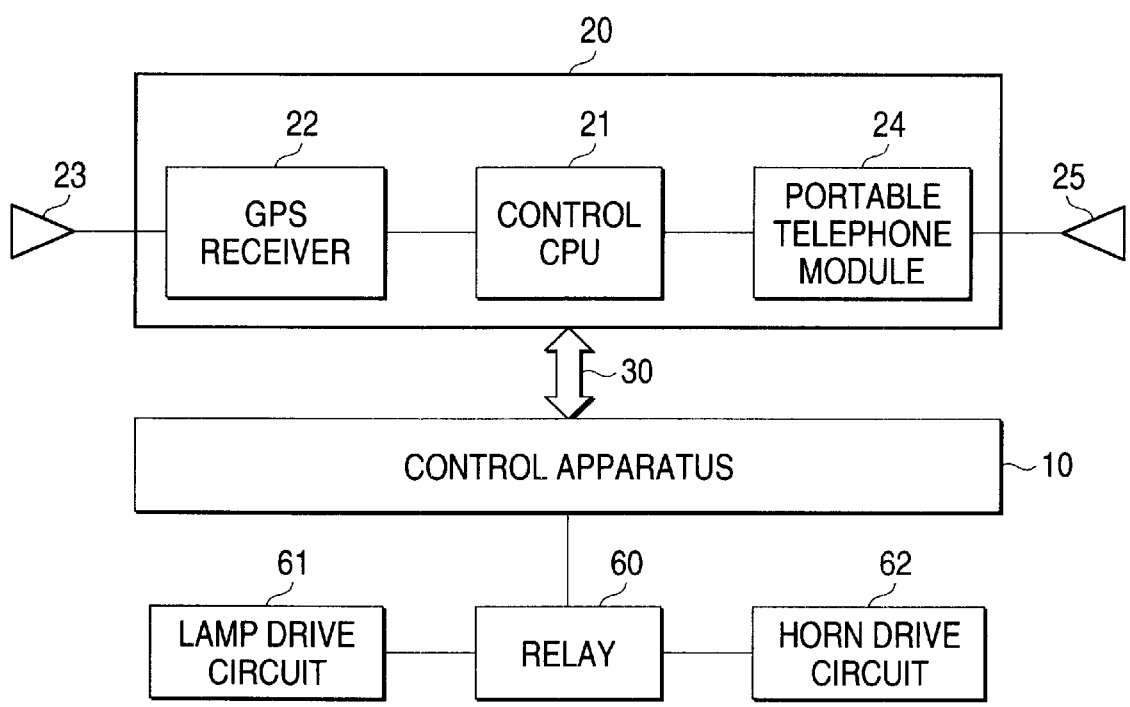
FIG. 13 is a schematic block diagram for indicating an arrangement of an on-vehicle electronic appliance according to one embodiment mode, used to realize the vehicle-theft warning system capable of notifying the move of the vehicle, and the stolen-vehicle tracking system capable of notifying the stolen vehicle, according to the present invention.

On-Vehicle Electronic Appliance for Vehicle-Theft Warning System and Stolen-Vehicle Tracking System FIG. 13 schematically represents an arrangement of an on-vehicle electronic appliance of the vehicle 1, used to realize a vehicle-theft warning system and also a stolen-vehicle tracking system, according to an embodiment mode of the present invention. The vehicle-theft warning system notifies that the vehicle 1 is moved when a firstly stored position of the vehicle 1 is not made coincident with a position of this vehicle 1 which is acquired in a periodic manner.

In this drawing, a communication unit 20 containing a GPS (global positioning system) receiver is connected via a bus line 30 to a control apparatus 10 constituted by a CPU (central processing unit). This communication unit 20 containing the GPS receiver is identical to the communication unit 20 containing the GPS receiver shown in FIG. 2, and is arranged by a control CPU 21, a GPS receiver 22, and a portable telephone module 24. In other words, both the GPS receiver 22 which receives positional information of a vehicle on a map from an antenna 23, and the portable telephone module 24 are connected to the control CPU 21 of the communication unit 20 containing the GPS receiver. The positional information entered from the GPS receiver 22 may be transmitted via an antenna 25 to the management center 3. Then, this control CPU 21 may transmit and receive data with respect to the control apparatus 10. While the control CPU 21 is driven by a signal supplied from the control apparatus 10, this control CPU 21 may receive the positional information of the vehicle from the GPS receiver 22 via the antenna 23, may fetch the positional information to the control apparatus 10, and may transmit the positional information via the antenna 25 to the control center 3.

A relay 60 is connected to this control apparatus 10, and both a lamp drive circuit 61 and a horn drive circuit 62 are connected to this relay 60. Since this relay 60 is actuated, both the lamp drive circuit 61 and the horn drive circuit 62 may be actuated.

Now, when the member inputs the ID code for specifying this member by using either the portable telephone 4 or the user PC 5 so as to be connected to the management center 3 via the Internet and also to request this management center 3 to monitor the specific vehicle after the vehicle 1 is parked, a present position of the vehicle 1 is received as latitude/longitude information of the vehicle 1 from the antenna 23 by the GPS receiver 22 under control of the control CPU 21 containing this GPS receiver 22. Thereafter, this received latitude/longitude information is converted into positional information on the map under control of the control CPU 21, and this converted positional information is transmitted from the antenna 25 to the management center 3. Since this positional information of the vehicle 1 is transmitted from the communication unit 20, the management center 3 may confirm the present position of the vehicle 1 when this vehicle 1 is parked. The position of this vehicle 1 is confirmed in a periodic manner by executing the polling operation from the management center 3.

Thereafter, when the vehicle 1 is moved contrary to owner's will, the position of the vehicle 1 in which that this vehicle 1 is stopped and the passenger parks this vehicle 1 (namely, firstly stored position of vehicle 1) is changed. As explained above, in such a case that the firstly stored position of the vehicle 1 is no longer made coincident with the position of the vehicle 1 which has been acquired in the regular manner, the management center 3 judges that the vehicle 1 is moved due to a car theft and the like, and thus, transmits a control signal to the portable telephone module 24 via the antenna 24 of the communication unit 20 containing the GPS receiver. The control signal transmitted to the portable telephone module 24 may drive the control apparatus 10, and then, this control apparatus 10 may actuate the relay 60 in response to the control signal sent from the management center 3. When this relay 60 is actuated, the control apparatus 10 may operate the lamp drive circuit 61 capable of turning ON a head lamp and the like so as to turn ON/OFF the head lamp and the like, and/or may operate the horn drive circuit 62 capable of controlling klaxon (horn sound) so as to produce klaxon.

At the same time, the management center 3 retrieves an existence position of the vehicle 1 on the map from the map database 36 based upon the latest positional information of the vehicle 1, which has been acquired in the periodic manner (by transmitting data from communication unit 20 mounted on vehicle 1, or by performing polling operation), superimposes the present position of the vehicle 1 on the map, and then, transmits the superimposed positional information to either the portable telephone 4 or the user PC 5, owned by the member so as to display the existence position of the vehicle 1.

Figure 14:
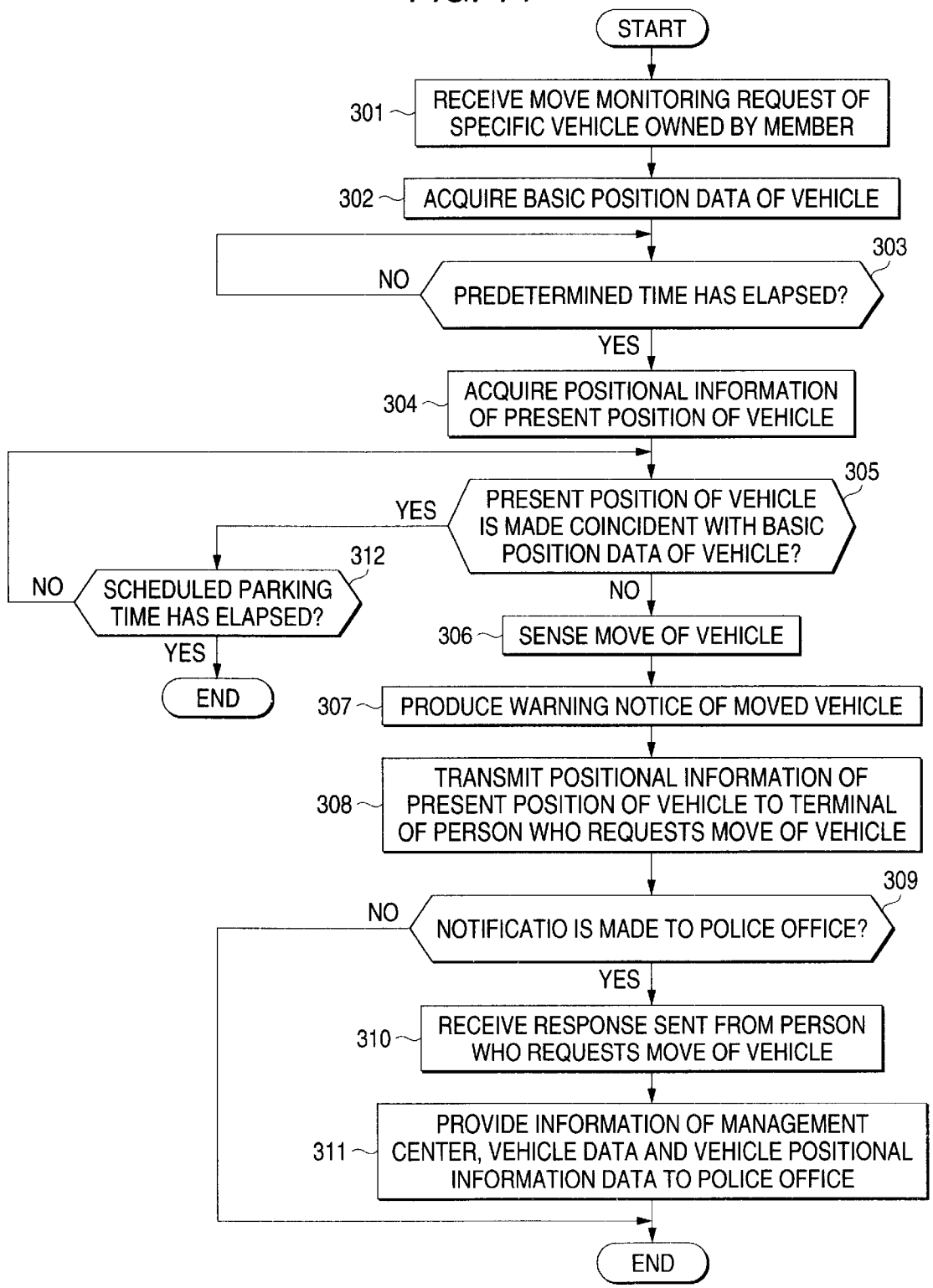
FIG. 14 is a flow chart for describing operations of the management centers employed in both the vehicle-theft warning system capable of notifying the move of the vehicle, and the stolen-vehicle tracking system capable of notifying the stolen vehicle, according to the present invention.

Both the vehicle-theft warning system and the stolen-vehicle tracking system are operable in such a case that the vehicle 1 owned by the member is moved during the scheduled parking time entered by this member. Referring now to a flow chart shown in FIG. 14, a description will be made of operations of the management center 3 when this member requests to monitor the move of the specific vehicle.

First of all, the member parks this vehicle 1, and thereafter, enters an ID code capable of specifying this member by manipulating either the portable telephone 4 or the user PC 5 so as to connect to the management center 3 via the Internet. After this Internet connection is established, if the member requests to monitor a move of a specific vehicle, then the management center 3 firstly accepts such an operation that the member inputs a vehicle number of the vehicle 1 which is requested to monitored, and furthermore, enters scheduled parking time so as to request the move monitoring operation of the specified vehicle owned by this member (step 301). This vehicle number of the vehicle 1 corresponds to such a registration number which has been registered in a governmental office, concretely speaking, a number displayed on a number plate of this vehicle. When the management center 3 receives the request of monitoring the move of the specific vehicle owned by the member at this step 301, this management center 3 interrogates the portable telephone module 24 of the communication unit 20 containing the GPS receiver of the vehicle 1 (step 302), and also acquires the present positional information of the vehicle 1 to be stored as basic position data into the data memory area 38 of the management center 3.

When the basic positional data of the vehicle 1 is acquired at the step 302, the management center 3 judges as to whether or not preselected time (for example, 1 minute, 3 minutes, 5 minutes etc.) has elapsed (step 303). This judgment is carried out so as to monitor a present position of the vehicle 1 every time the preselected time has passed. In the beginning, after the acquisition of the basic positional data is carried out, the positional information as to the present position of the vehicle 1 is carried out every time preselected time has passed. When the management center 3 judges at this step 303 that the predetermined time (for example, 1 minute, 3 minutes, 5 minutes etc.) has elapsed, the management center 3 acquires the positional information of the present position of the vehicle 1 (step 304). When the acquisition of the positional information as to the present position of the vehicle 1 is carried out at this step 304, the management center 3 judges as to whether or not the presently acquired present position of the vehicle 1 is made coincident with the basic positional data (namely, position of vehicle 1 specified as parking position) of the vehicle 1 (step 305). When the management center 3 judges at this step 305 that the acquired present position of the vehicle 1 is not made coincident with the basic positional data (position of vehicle 1 specified as parking position) of this vehicle 1, this management center 3 senses such a fact that the vehicle 1 is moved (step 306). At a step 307, the management center 3 transmits a control signal to the communication unit 20 mounted on the vehicle 1 so as to drive the control apparatus 10, and then, this control apparatus 10 operates the lamp drive circuit 61 for controlling turning-ON of the head lamp in order to turn ON/OFF the head lamp, and also operates the horn drive circuit 62 for controlling the horn sound operation so as to produce the horn sound, so that a warning notice is produced. Furthermore, at a step 308, the management center 3 retrieves an existence position of the vehicle 1 on the map from the map database 36 based upon the latest positional information of the vehicle 1, which has been acquired by transmitting data from communication unit 20 mounted on vehicle 1, or by performing polling operation, superimposes the present position of the vehicle 1 on the map, and then, transmits the superimposed positional information to either the portable telephone 4 or the user PC 5, owned by the member. Then, this operation flow is ended.

In such a case that the formed vehicle positional information data is transmitted by using either the portable telephone 4 or the user PC 5, owned by the member at this step 308, at the next step 309, the management center 3 interrogates the owner of the vehicle 1 as to whether or not a notification is made to a police station (relevant government office) based upon the vehicle positional information data acquired as a result of the polling operation to the vehicle 1. When the owner of the vehicle 1 answers that no notification is made of the police station at this step 309, this process flow is accomplished. To the contrary, when this vehicle owner answers that a notification should be made of the police station at this step 309, the management center 3 receives such a response from the owner of the vehicle 1 that the notification should be made of the police station. At a next step 311, this management center 3 notifies to the police station, such a fact that the monitoring subject vehicle is stolen, and furthermore, provides the information of the management center 3, the vehicle data of the vehicle 1 owned by the member, and the positional information data of this vehicle 1. Then, this operation flow is accomplished.

On the other hand, when the management center 3 judges at the step 305 that the acquired present position of the vehicle 1 is made coincident with the basic positional data (namely, position of vehicle 1 specified as parking position) of this vehicle 1, the management center 3 judges as to whether or not a time duration after parking this vehicle 1 exceeds the scheduled parking time (step 312). When the management center 3 judges at this step 312 that the time duration after parking the vehicle 1 does not exceed the scheduled parking time, this process operation is returned to the previous step 305. To the contrary, when the management center 3 judges that the time duration after parking the vehicle 1 exceeds the scheduled parking time, this operation flow is ended.

Vehicle-Theft Warning System and Theft-Warning Vehicle Tracking System

Figure 15:
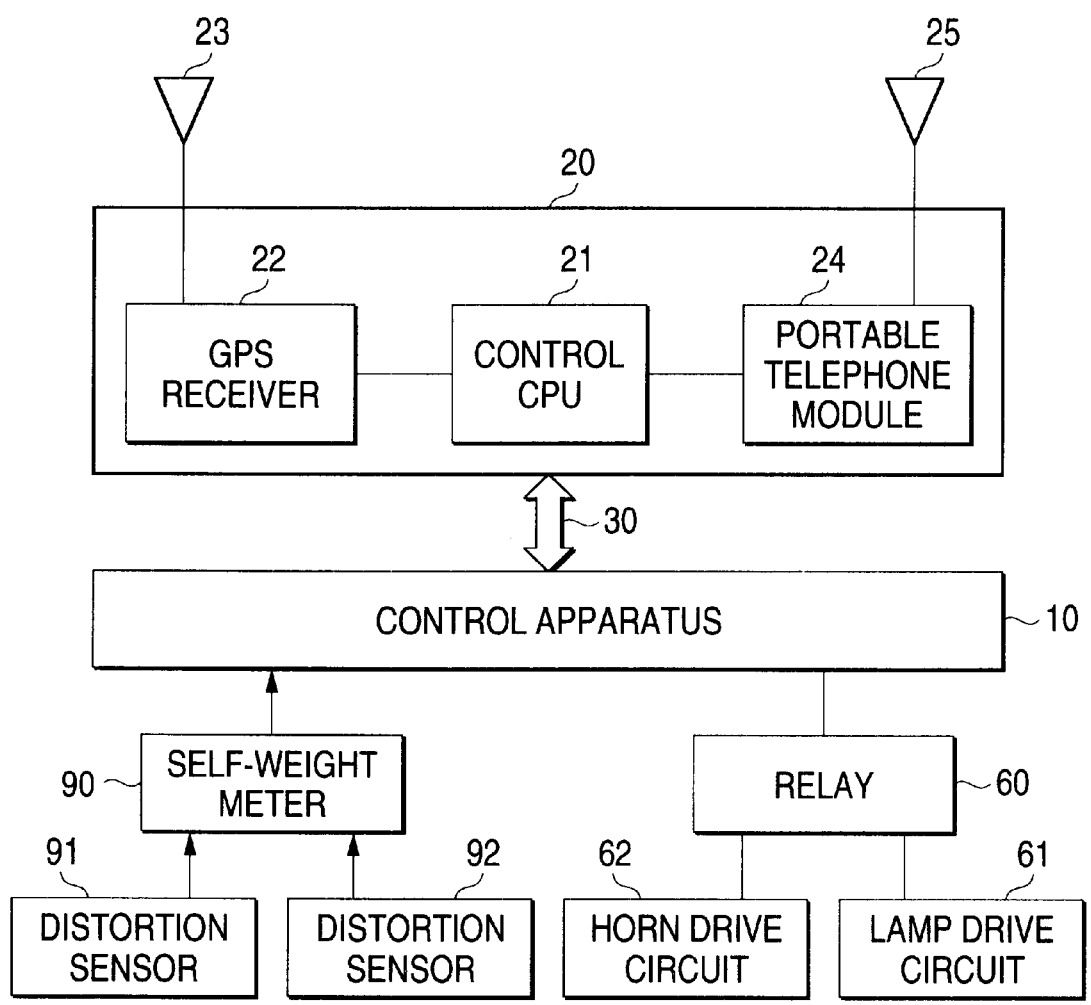
FIG. 15 is a schematic block diagram for indicating an arrangement of an on-vehicle electronic appliance according to another embodiment mode, used to realize the vehicle-theft warning system capable of notifying the move of the vehicle, and the stolen-vehicle tracking system capable of notifying the stolen vehicle, according to the present invention.

FIG. 15 schematically represents an arrangement of an on-vehicle electronic appliance of the vehicle 1, which is employed so as to realize both a vehicle-theft warning system, and a theft-warning vehicle tracking system, according to another embodiment of the present invention. In accordance with this vehicle-theft warning system, while a self-weight of the vehicle 1 is stored in the case that a passenger stops this vehicle 1, takes off this vehicle 1, and locks a door of this vehicle 1, when there is a change in this stored self-weight of the vehicle 1, this vehicle-theft warning system notifies that an abnormal condition happens to occur in this vehicle 1. Thereafter, when a firstly stored position of the vehicle 1 is changed from a position of the vehicle 1 acquired in a periodic manner, the theft-warning vehicle tracking system notifies that this vehicle 1 is stolen.

In this drawing, a communication unit 20 containing a GPS (global positioning system) receiver is connected via a bus line 30 to a control apparatus 10 constituted by a CPU (central processing unit). This communication unit 20 containing the GPS receiver is identical to the communication unit 20 containing the GPS receiver shown in FIG. 2, and is arranged by a control CPU 21, a GPS receiver 22, and a portable telephone module 24. In other words, both the GPS receiver 22 which receives positional information of a vehicle on a map from an antenna 23, and the portable telephone module 24 are connected to the control CPU 21 of the communication unit 20 containing the GPS receiver. The positional information entered from the GPS receiver 22 may be transmitted via an antenna 25 to the management center 3. Then, this control CPU 21 may transmit and receive data with respect to the control apparatus 10. While the control CPU 21 is driven by a signal supplied from the control apparatus 10, this control CPU 21 may receive the positional information of the vehicle from the GPS receiver 22 via the antenna 23, may fetch the positional information to the control apparatus 10, and may transmit the positional information via the antenna to the control center 3.

A self-weight meter 90 is connected to this control apparatus 10. A distortion sensor 91 and another distortion sensor 92 are connected to this control apparatus 10, which are mounted on each of wheel shafts. The distortion sensor 91 corresponds to such a distortion sensor which is mounted on, for example, each wheel shaft of front wheels. The distortion sensor 92 corresponds to such a distortion sensor which is mounted on, for instance, each wheel shaft of rear shafts. This self-weight meter 90 is such a meter capable of sensing a self-weight of the vehicle 1. While distortion amounts of the respective wheel shafts to which the distortion sensors 91 and 92 are mounted are sensed by the respective distortion sensors 91 and 92, the self-weight meter 90 detects the self-weight of the vehicle 1 based upon the distortion amounts of the respective wheel shafts detected by these distortion sensors 91 and 92. The signal outputted from this self-weight meter 90 is supplied to the control apparatus 10, and then, is transmitted via the communication unit 20 to the management center 3 so as to be recorded.

A relay 60 is connected to this control apparatus 10, and both a lamp drive circuit 61 and a horn drive circuit 62 are connected to this relay 60. Since this relay 60 is actuated, both the lamp drive circuit 61 and the horn drive circuit 62 may be actuated.

The output value derived from the self-weight 90 is detected by the control apparatus 10 in the management center 3. That is, after the vehicle 1 is parked, the member inputs the ID code for specifying this member by using either the portable telephone 4 or the user PC 5 so as to be connected to the management center 3 via the Internet and also to request this management center 3 to monitor the specific vehicle. When the passenger takes off this vehicle and locks the doors, this output value of the self-weight meter 90 is sensed by the control apparatus 10 based upon the distortion amounts of the respective wheel shafts detected by the distortion sensors 91 and 92. This output value detected from the self-weight meter 90 is transmitted from the control CPU 21 via the portable telephone module 24 and the antenna 24 to the control center 3. Since this output value is transmitted from the communication unit 20 of this vehicle 1, the management center 3 may confirm such a self-weight of the vehicle 1 after the passenger takes off this vehicle 1 when the vehicle 1 is parked. This self-weight of the vehicle 1 is conformed by performing the polling operation from the management center 3 in a periodic manner.

Also, when the member requests to monitor the move of the specific vehicle, such a position of the vehicle 1 when the passenger takes off the vehicle 1 and locks the door thereof after the vehicle 1 is parked is received as latitude/longitude information of the vehicle 1 from the antenna 23 by the GPS receiver 22 under control of the control CPU 21 of the communication unit 20 containing the GPS receiver. Thereafter, this received latitude/longitude information is converted into positional information on the map under control of the control CPU 21, and this converted positional information is transmitted from the antenna 25 to the management center 3. Since this positional information of the vehicle 1 is transmitted from the communication unit 20, the management center 3 may confirm the present position of the vehicle 1. The position of this vehicle 1 is confirmed in a periodic manner by executing the polling operation from the management center 3.

Thereafter, when the vehicle 1 is moved contrary to owner's will, the position of the vehicle 1 in which this vehicle 1 is stopped and the passenger parks this vehicle 1 (namely, firstly stored position of vehicle 1) is changed. As explained above, in such a case that the firstly stored position of the vehicle 1 is no longer made coincident with the position of the vehicle 1 which has been acquired in the periodic manner, the management center 3 judges that the vehicle 1 is moved due to a car theft and the like, and thus, transmits a control signal to the portable telephone module 24 via the antenna 24 of the communication unit 20 containing the GPS receiver. The control signal transmitted to the portable telephone module 24 may drive the control apparatus 10, and then, this control apparatus 10 may actuate the relay 60 in response to the control signal sent from the management center 3. When this relay 60 is actuated, the control apparatus 10 may operate the lamp drive circuit 61 capable of turning ON a head lamp and the like so as to turn ON/OFF the head lamp and the like, and/or may operate the horn drive circuit 62 capable of controlling klaxon (horn sound) so as to produce klaxon.

At the same time, the management center 3 retrieves an existence position of the vehicle 1 on the map from the map database 36 based upon the latest positional information of the vehicle 1, which has been acquired in the periodic manner (by transmitting data from communication unit 20 mounted on vehicle 1, or by performing polling operation), superimposes the present position of the vehicle 1 on the map, and then, transmits the superimposed positional information to either the portable telephone 4 or the user PC 5, owned by the member so as to display the existence position of the vehicle 1.

Figure 16:
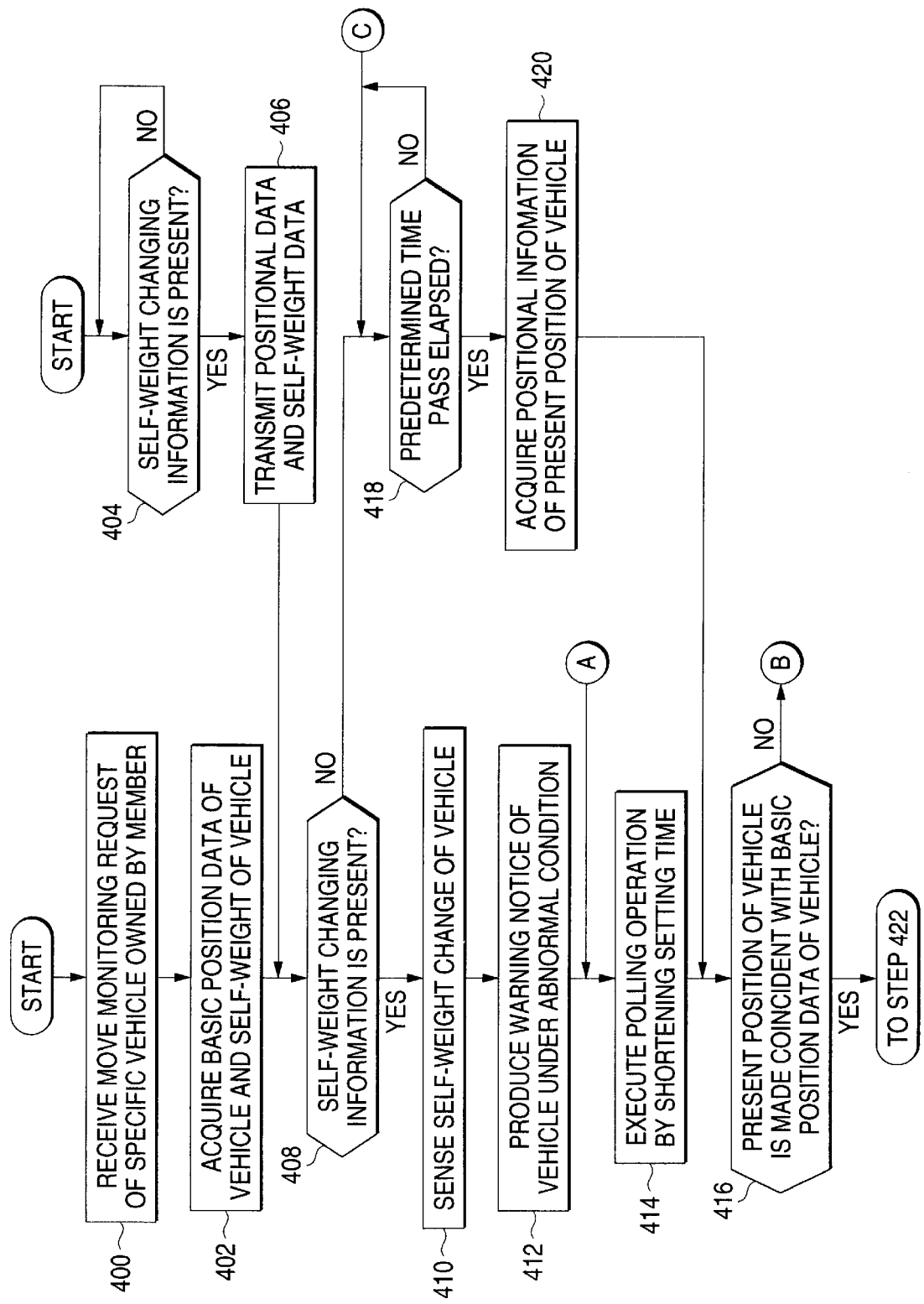
FIG. 16 is a flow chart for explaining operations executed on the management center side of both the vehicle-theft warning system capable of notifying the move of the vehicle, and the stolen vehicle tracking system capable of notifying the stolen-vehicle, according to the present invention.

Both the vehicle-theft warning system and the stolen-vehicle tracking system with employment of the above-described arrangements are operable in such a case that the self-weight of the own vehicle 1 is changed (namely, any person other than owner of this vehicle 1 rides this vehicle 1), and also the vehicle 1 owned by the member is moved during the scheduled parking time entered by this member. Referring now to a flow chart shown in FIG. 16, a description will be made of operations of the management center 3 when this member requests to monitor the move of the specific vehicle.

First of all, the member parks this vehicle 1, and thereafter, enters an ID code capable of specifying this member by manipulating either the portable telephone 4 or the user PC 5 so as to be connected to the management center 3 via the Internet. After this Internet connection is established, if the member requests to monitor a move of a specific vehicle, then the management center 3 firstly accepts at a step 400 such an operation that the member firstly inputs a vehicle number of the vehicle 1 which is requested to monitored as to the move of this vehicle 1 so as to specify the move-monitoring vehicle, and furthermore, enters scheduled parking time so as to request the move monitoring operation of the specified vehicle owned this member. This vehicle number of the vehicle 1 corresponds to such a registration number which has been registered in a governmental office, concretely speaking, a number displayed on a number plate of this vehicle. In the case that the management center 3 receives the request of monitoring the move of the specific vehicle of the member at this step 400, and then the passenger takes off this vehicle 1 and locks the door thereof, the management center 3 interrogates the portable telephone module 24 of the communication unit 20 containing the GPS receiver of the vehicle 1 to receive via this portable telephone module 24 and the antenna 25, both such a self-weight information and such a positional information. That is, this self-weight information is detected by the self-weight meter 91 of the vehicle 1 where a total number of passengers becomes zero. This positional information is obtained as the latitude/longitude information of the vehicle 1 received from the GPS receiver 22 via the antenna 23 under control of the control CPU 21 of the communication unit containing the GPS receiver.

Then, based upon the received latitude/longitude information, the positional information is converted into such a positional information on the map by the control CPU 21.

On the other hand, on the side of the vehicle 1, after the vehicle 1 is parked and the door thereof is locked, the management center 3 detects as to whether or not there is a change in the self-weight of the vehicle 1 in the periodic manner at a step 404. When the management center 3 judges at this step 404 that there is such a change in the self-weights of the vehicle 1, this management center 3 transmits both the self-weight data of the vehicle 1 and the positional data acquired at this time at a step 406. It should be noted that the self-weight data/positional data of the vehicle 1 at this step 406 may constitute an interrupt of the process operation executed on the side of the management center 3.

In other words, when an interrupt is made from the vehicle side by the self-weight data in such a manner that there is a change in the self-weights of the vehicle 1, the management center 3 judges at a step 408 as to whether or not the self-weight data transmitted from the vehicle side is changed from the firstly stored self-weight data (namely, self-weight of vehicle 1 when vehicle 1 is stopped and door thereof is locked), namely, whether the self-weight is increased, or decreased. In the case that the self-weight is increased, it is so conceived that any person other than the passenger of the vehicle 1 rides this vehicle 1. In this case, it is so conceived that someone plays a prank on this vehicle 1. Otherwise, it is so conceived that a substance drops on the vehicle 1, for example, stone drops on the vehicle 1, or a tree is bent onto the vehicle 1. In this case, it is so conceived that an abnormal condition happens to occur as to the vehicle 1.

On the other hand, when the self-weight data is decreased, the following cases may be conceived. That is, the vehicle 1 is jacked up (tire and/or wheel is stolen, and/or vehicle is moved by wrecker); and articles belonging to the vehicle 1 are stolen, for example, a battery of the vehicle 1 is disconnected, and gasoline is stolen from the vehicle 1.

When the management center 1 judges that the self-weight data of the vehicle 1 is changed at this step 408, this management center 3 senses this change in the self-weights of the vehicle 1 at a step 410, and thus judges that an abnormal condition happens to occur in the vehicle 1. At a step 412, the management center 3 transmits a control signal to the communication unit 20 mounted on the vehicle 1 so as to drive the control apparatus 10. Thus, the control apparatus 10 may operate the lamp drive circuit 61 capable of turning ON the head lamp and the like so as to turn ON/OFF the head lamp and so on, and/or may operate the horn drive circuit 62 capable of controlling klaxon (horn sound) so as to produce a warning notice such as klaxon.

When the warning notice is produced at this step 412, while the setting time of the polling operation as to the positional information of the vehicle 1 is changed into such a time duration shorter the normal time duration (for example, ½ of normal time duration, ⅓ thereof, ¼ thereof etc.), the management center 3 performs the polling operation of the positional information of the vehicle 1. The reason why this polling time duration is made shorter is given as follows: That is, when the vehicle 1 is stolen, the move position of this stolen vehicle 1 must be precisely grasped so as to track (survey) this stolen vehicle 1. When the setting time is made shorter than the normal time and the polling operation of the positional information of the vehicle 1 is carried out at this step 414, and further the positional information of the present portion of the vehicle 1 is acquired, the management center 3 judges as to whether or not the presently acquired present position of the vehicle 1 is made coincident with the basic position data of the vehicle 1 (namely, position of vehicle 1 specified as parking position).

On the other hand, when the management center 3 judges that there is no change in the self-weight data of the vehicle 1 at the step 408, this management center 3 waits for a further operation at a step 418 until a preselected time duration (for example, 1 minute, 3 minutes, and 5 minutes etc.) has elapsed, and then the management center 3 judges as to whether or not the preselected time (for example, 1 minute, 3 minutes, 5 minutes etc.) has elapsed at this step 418. This judgement is carried out so as to monitor a present position of the vehicle 1 every time the preselected time has passed. In the beginning, after the acquisition of the basic positional data is carried out, the positional information as to the present position of the vehicle 1 is carried out every time preselected time has passed. When the management center 3 judges at this step 418 that the predetermined time (for example, 1 minute, 3 minutes, 5 minutes etc.) has elapsed, the management center 3 acquires the positional information of the present position of the vehicle 1 at a step 420. When the acquisition of the positional information as to the present position of the vehicle 1 is carried out at this step 420, the management center 3 judges at a step 416 as to whether or not the presently acquired present position of the vehicle 1 is made coincident with the basic positional data (namely, position of vehicle 1 specified as parking position) of the vehicle 1.

When the management center 3 judges at this step 420 that the acquired present position of the vehicle 1 is not made coincident with the basic positional data (position of vehicle 1 specified as parking position) of this vehicle 1, this management center 3 senses such a fact that the vehicle 1 is moved at a step 422. At a step 424, the management center 3 transmits a control signal to the communication unit 20 mounted on the vehicle 1 so as to drive the control apparatus 10, and then, this control apparatus 10 operates the lamp drive circuit 61 for controlling turning-ON of the head lamp in order to turn ON/OFF the head lamp, and also operates the horn drive circuit 62 for controlling the horn sound operation so as to produce the horn sound, so that a warning notice is produced.

Furthermore, when the warning notice is produced at this step 424, at a step 426, the management center 3 retrieves an existence position of the vehicle 1 on the map from the map database 36 based upon the latest positional information of the vehicle 1, which has been acquired by transmitting data from the communication unit 20 mounted on vehicle 1, or by performing the polling operation, and this management center 3 superimposes the present position of the vehicle 1 on the map, and then, transmits the superimposed positional information to either the portable telephone 4 or the user PC 5, owned by the member.

In such a case that the formed vehicle positional information data is transmitted by using either the portable telephone 4 or the user PC 5, owned by the member at this step 424, at the next step 428, the management center 3 interrogates the owner of the vehicle 1 as to whether or not a notification is made to a police station (relevant government office) based upon the vehicle positional information data acquired as a result of the polling operation to the vehicle 1. When the owner of the vehicle 1 answers that no notification is made of the police station at this step 428, this process flow is accomplished. To the contrary, when this vehicle owner answers that a notification should be made of the police station at this step 428, the management center 3 receives such a response from the owner of the vehicle 1 that the notification should be made of the police station (step 430). At a next step 432, this management center 3 notifies to the police station, such a fact that the monitoring subject vehicle is stolen, and furthermore, provides the information of the management center 3, the vehicle data of the vehicle 1 owned by the member, and the positional information data of this vehicle 1. Then, this operation flow is accomplished.

On the other hand, when the management center 3 judges at the step 416 that the acquired present position of the vehicle 1 is made coincident with the basic positional data (namely, position of vehicle 1 specified as parking position) of this vehicle 1, the management center 3 judges as to whether or not there is a change in the self-weights of the vehicle 1 within a predetermined time duration. This judgement corresponds to such a case that although there is a change in the self-weights of the vehicle, this vehicle is not moved. In this case, since the management center 3 cannot confirm as to whether or not this vehicle is stolen, the management center 3 checks as to whether or not the self-weight of the vehicle 1 is again changed after waiting for an elapse of a predetermined time. At this step 434, when the management center 3 judges that the self-weight of the vehicle 1 is changed within the predetermined time duration, the management center 3 judges as to whether or not the self-weight of the vehicle 1 is returned to the original self-weight due to this self-weight change. In other words, if the self-weight of the vehicle 1 is returned to the original self-weight within the preselected time duration even when the self-weight of the vehicle 1 is varied, then the management center 3 can recognize that the self-weight of the vehicle 1 is temporarily changed due to a certain reason (for instance, strong wind and earthquake etc.). When the management center 3 judges that the self-weight of the vehicle 1 is returned to the original self-weight thereof at this step 436, the process operation is returned to the previous step 418.

To the contrary, when the management center 3 judges that the self-weight of the vehicle 1 is not returned to the original self-weight thereof at the step 436, this management center 3 notifies to the request making person, such a fact that the self-weight of the vehicle 1 is changed at a step 438. Also, when the management center 3 judges that there is no change in the self-weight of the vehicle 1 within the predetermined time period at the step 434, since there are large possibilities that a certain abnormal condition may occur in this vehicle 1, the management center 3 notifies this fact to the request making person, and then, the process operation is advanced to the step 414.

In accordance with the present invention, with respect to the member whose vehicle is the missing vehicle, the existence position of this missing vehicle can be supplied while being displayed on the map.

The process operation with respect to the car theft can be quickly and firmly carried out.

Even when the member does not request to provide the positional information of the own vehicle, the positional information data can be automatically started to be transmitted while using the abnormal condition of the vehicle as the trigger, and thus, the position of the vehicle can be sent to the management center.

While the existence position of the rental vehicle is automatically retrieved when the rental term is ended, the existence position of the rental vehicle can be supplied with being displayed on the map even in such a case that the rental contract making person does not take off the rental vehicle in a previously-set area at the end of this rental term.

The rental company can readily grasp the existence areas of all of the rental vehicles owned by this rental company, while this rental company itself need not search these rental vehicles.

The proper process operation can be quickly and firmly carried out with respect to the illegal use of the rental vehicle contract person.

When the back-up power supply of the communication unit containing the GPS receiver is actuated due to the occurrence of the abnormal condition of the vehicle, this abnormal operation (car theft etc.) of the vehicle can be detected and the positional information of this vehicle can be transmitted to the management center. As a result, even when the member cannot become aware of the abnormal condition (car theft etc.) of the own vehicle, this member can grasp the positional information of this vehicle in the proper manner.

It is possible to avoid such an operation that the vehicle position map information is mistakenly supplied to the third party, while the vehicle position map information where the existence position of the missing vehicle owned by the member is displayed on the map is provided to such a member.

In such a case that when the vehicle owned by the member is parked at the specific parking position for a predetermined time duration, this vehicle is moved from the specific position before the predetermined time duration has passed, it is possible to notify such a fact that the vehicle is stolen, while the warning notice is issued from this stolen vehicle.

Such a fact that the vehicle encounters with the theft can be surely notified to persons who are present near this stolen vehicle.

In such a case that when the vehicle owned by the member is parked at the specific parking position for a predetermined time duration, this vehicle is moved from the specific position before the predetermined time duration has passed, and then is stolen, the move position of this stolen vehicle can be clarified on the map in the periodic manner, which can be provided to the owner of this stolen vehicle.

Even where the owner of the stolen vehicle is located, the stolen-vehicle tracking information can be sequentially provided.

The proper process operation can be quickly and firmly carried out with respect to the person who has stolen the vehicle.

In such a case that even while the door of the vehicle is locked and therefore no passenger is present in this vehicle, a certain weight is applied to this vehicle and thus the self-weight of this vehicle is changed, it is possible to notify such a car theft by producing the warning notice from this vehicle.

Such a fact that the vehicle encounters with the theft can be surely notified to persons who are present near this stolen vehicle.

In such a case that even while the door of the vehicle is locked and therefore no passenger is present in this vehicle, a certain weight is applied to this vehicle and thus the self-weight of this vehicle is changed, it is possible to notify such a car theft by producing the warning notice from this vehicle, while it is so judged that this vehicle is stolen. Then, while the polling operation of the vehicle position is carried out in a short time interval, the move position of this stolen vehicle can be clearly indicated on the map, which may be provided to this vehicle owner.

Even where the owner of the stolen vehicle is located, the stolen-vehicle tracking information can be sequentially provided.

The proper process operation can be quickly and firmly carried out with respect to the person who has stolen the vehicle.

What is claimed is:

1. A vehicle tracking system wherein:
with respect to rental vehicles on which communication units containing GPS receivers are mounted, when a rental term of a rental vehicle ends, the vehicle tracking system specifies the rental vehicle based upon vehicle data transmitted from the rental vehicle; executes a polling operation of position information to the rental vehicle; retrieves a current position of the vehicle on a map from a map database based upon positional information transmitted from the rental vehicle; displays the current position of the rental vehicle by superimposing on the map; and acquires vehicle positional information data.

2. The vehicle tracking system according to claim 1, wherein
the vehicle positional information data is provided to a rental company.

3. A vehicle tracking system according to claim 1, wherein
the vehicle position information data to be provided to the rental company is provided to a necessary governmental office in response to a request issued from the rental company.

4. A vehicle tracking system according to claim 3, wherein the governmental office is a police station.

5. A vehicle tracking system according to claim 1, wherein
a back-up power supply is connected to the communication unit containing the GPS receiver, and the positional information is automatically transmitted from the rental vehicle by interrupting a power supply circuit of the rental vehicle in a case that the rental vehicle is under emergency state.

6. A vehicle tracking system, wherein
with respect to vehicles owned by members on which communication units containing GPS receivers are mounted,
when a positional information providing request for providing positional information of a vehicle owned by a member which has previously been registered into a management company by specifying a member code is transmitted to the management company, with applying the member code to the positional information providing request, the positional information providing request is transmitted to the management company and transmitted to a map distribution company;
the management company specifies the member and the vehicle owned by the member based upon the vehicle positional information providing request, and executes a polling operation of the positional information with respect to the vehicle owned by the member;
the management company transmits a result of the polling operation of the positional information with respect to the vehicle owned by the member to the map distribution company, applying the member code thereto; and
in the case that a transmission code of the vehicle positional information providing request transmitted from the member is made coincident with a transmission code of the vehicle positional information providing request transmitted from the management company, the map distribution company retrieves a current position of the vehicle on a map from a map database based upon the positional information of the vehicle owned by the member, which is transmitted from the management company; displays the current position of the vehicle by superimposing on the map; and transmits the current position of the vehicle as vehicle positional information to the member.

7. A vehicle-theft warning system, wherein
with respect to vehicles owned by members, on which communication units containing GPS receivers are mounted,
based upon a move monitoring request issued from a terminal of a previously-registered member by inputting an ID code, a vehicle number of a vehicle owned by the previously registered member, and parking time,
the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered member; retrieves and stores a current position of the vehicle on a map from a map database based upon the positional information transmitted from the vehicle owned by the previously-registered member; and produces a warning notice by employing an electronic appliance mounted on the vehicle in such a case that the current position of the vehicle is changed within the parking time which is previously registered by the member.

8. A vehicle-theft warning system according to claim 7, wherein
the warning notice made by employing the on-vehicle electronic appliance is realized by tuning ON/OFF a lamp, or by actuating a horn.

9. A stolen-vehicle tracking system, wherein
with respect to vehicles owned by members, on which communication units containing GPS receivers are mounted,
based upon a move monitoring request issued from a terminal of a previously-registered member by inputting an ID code, a vehicle number of a vehicle owned by the previously-registered member, and parking time,
the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered member; retrieves and stores a current position of the vehicle on a map from a map database based upon the positional information transmitted from the vehicle owned by the previously-registered member; and notifies a move of the vehicle position to the terminal of the previously-registered member when the current position of the vehicle is changed within the parking time which is previously registered by the member; and displays the current position of the vehicle by superimposing on the map on the terminal of the member, so that present vehicle position information data is provided to the previously-registered member.

10. A stolen-vehicle tracking system according to claim 9, wherein
the terminal of the member is a portable telephone, or a personal computer.

11. A stolen-vehicle tracking system according to claim 9, wherein
the vehicle position information data to be provided to the previously-registered member is provided to a necessary governmental office in response to a request issued from the previously-registered member.

12. A stolen-vehicle tracking system according to claim 11, wherein the governmental office is a police station.

13. A vehicle-theft warning system, wherein
with respect to vehicles owned by members, on which communication units containing GPS receivers are mounted,
based upon a move monitoring request issued from a terminal of a previously-registered member by inputting an ID code, a vehicle number of a vehicle owned by the previously-registered member, and parking time,
the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered member; retrieves and stores a current position of the vehicle on a map from a map database based upon the positional information transmitted from the vehicle owned by the previously-registered member; and produces a warning notice by employing an electronic appliance mounted on the vehicle in such a case that a passenger of the vehicle exits the vehicle and locks a door thereof, and thereafter, a self-weight of the vehicle is changed.

14. A vehicle-theft warning system according to claim 13, wherein
the warning notice made by employing the on-vehicle electronic appliance is realized by turning ON/OFF a lamp, or by actuating a horn.

15. A theft-warning vehicle tracking system, wherein
with respect to vehicles owned by members, on which communication units containing GPS receivers are mounted,
based upon a move monitoring request issued from a terminal of a previously-registered member by inputting an ID code, a vehicle number of a vehicle owned by the previously-registered member, and parking time,
the vehicle-theft warning system specifies the previously-registered member, the vehicle owned by the previously-registered member, and a position of the vehicle owned by the previously-registered member; executes a polling operation of positional information in a periodic manner with respect to the vehicle owned by the previously-registered member; retrieves and stores a current position of the vehicle on a map from a map database based upon the positional information transmitted from the vehicle owned by the previously-registered member; signals to the terminal a change in vehicle weights in the case that a passenger of the vehicle exits the vehicle and locks a door thereof, and thereafter, a self-weight of the vehicle is changed; notifies a move of a vehicle position to the terminal of the member in such a case that a current position of the vehicle is changed from a parking position which is previously registered by the previously-registered member; and displays the current position of the vehicle on the terminal of the member, while superimposing the current position on a map, so that present vehicle positional information data to the previously-registered member.

16. A theft-warning vehicle tracking system according claim 15, wherein
the terminal of the member is a portable telephone, or a personal computer.

17. A theft-warning vehicle tracking system according to claim 15, wherein
the vehicle position information data to be provided to the previously-registered member is provided to a necessary governmental office in response to a request issued from the previously-registered member.

18. A theft-warning vehicle tracking system according to claim 17, wherein the governmental office is a police station.

* * * * *